(12) United States Patent
Fukushima et al.

(10) Patent No.: US 6,388,638 B2
(45) Date of Patent: *May 14, 2002

(54) DISPLAY APPARATUS AND ITS CONTROL METHOD

(75) Inventors: Nobuo Fukushima, Yokohama; Yasuyuki Yamazaki, Matsudo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/547,471

(22) Filed: Oct. 24, 1995

(30) Foreign Application Priority Data

Oct. 28, 1994 (JP) .............................. 6-265186
Dec. 6, 1994 (JP) .............................. 6-330212

(51) Int. Cl.⁷ ................................................ G09G 5/00
(52) U.S. Cl. ............................... 345/7; 345/8; 345/121
(58) Field of Search ......................... 345/7, 8, 9, 121, 345/125

(56) References Cited

U.S. PATENT DOCUMENTS

| | | | | |
|---|---|---|---|---|
| 4,446,480 A | * | 5/1984 | Breglia et al. ................. | 345/7 |
| 5,320,534 A | * | 6/1994 | Thomas ........................ | 345/8 |
| 5,485,172 A | * | 1/1996 | Sawachika et al. ............ | 345/8 |
| 5,579,026 A | * | 11/1996 | Tabata ........................ | 345/121 |
| 5,583,692 A | * | 12/1996 | Funatsu ...................... | 359/422 |
| 5,657,034 A | * | 8/1997 | Yamazaki ..................... | 345/8 |
| 5,917,460 A | * | 6/1999 | Kodama ....................... | 345/7 |

OTHER PUBLICATIONS

C.J. Overbeeke, "Space Through Movement", pp. 93–146 (Chapter 2) and 153–190 (Chapter 4), Mar. 21, 1988, Doctoral Thesis, University of Delft.

* cited by examiner

*Primary Examiner*—John Tweel
(74) *Attorney, Agent, or Firm*—Morgan & Finnegan, LLP

(57) ABSTRACT

In a head-mount display apparatus with which an observer can observe images displayed on display units arranged in correspondence with the right and left eyes of the observer while wearing the apparatus on his or her head, first and second image display ranges are defined on each display unit. An angular velocity detection unit detects the displacement of the head of the observer, and changes the positions of the first and second image display ranges on the display units relative to each other on the basis of the detected displacement information of the head. As a result, a natural display corresponding to the movement of the head can be attained in real time even under the condition of a limited image memory capacity.

46 Claims, 16 Drawing Sheets

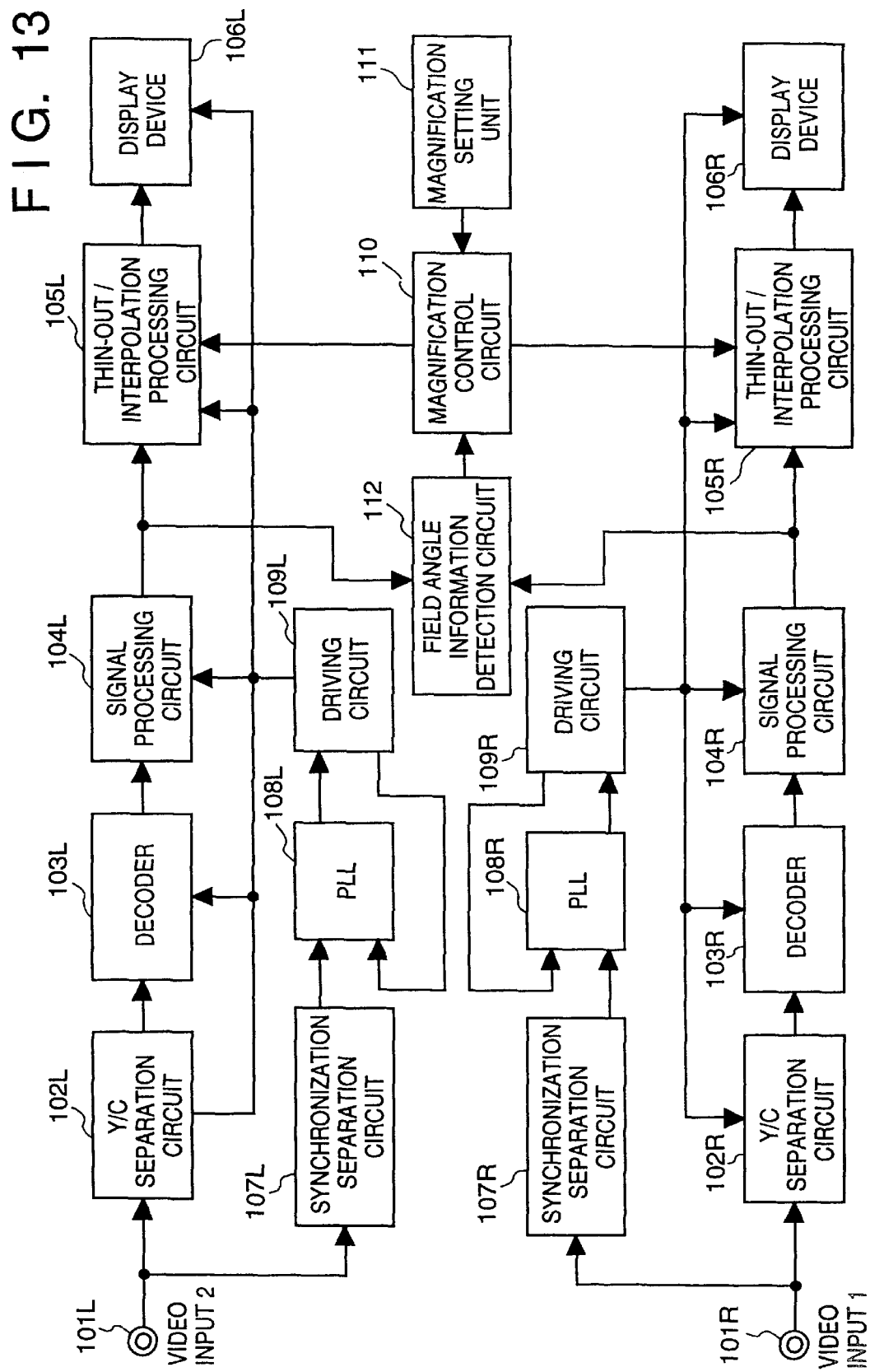

DISPLAY APPARATUS AND ITS CONTROL METHOD

BACKGROUND OF THE INVENTION

The present invention relates to a display apparatus for displaying a two- or three-dimensional image using display means such as a CRT, a liquid crystal panel, or the like and, more particularly, to a display apparatus suitable for a head-mount display apparatus, and its control method.

As a system which changes its display contents in correspondence with the movement of a user's head, a head-mount display apparatus is known. In a system of this type, it is a general practice to move the display region of the head-mount display apparatus, as indicated by bold frames in FIG. 9. Note that a portion surrounded by a broken line in FIG. 9 corresponds to a wide image region prepared in advance on a memory. As indicated by arrows in FIG. 9, a portion surrounded by the bold frame is moved in correspondence with the movement of the head, and the range of the bold frame is extracted and displayed on the entire display screen of the head-mount display apparatus.

As another method, a method of detecting the movement of an observer's head, calculating an image to be displayed in correspondence with the detected movement of the head, and generating and displaying an image by a CG (COMPUTER GRAPHICS) technique on the basis of the calculation result is known.

As described above, in a case where the head-mount display changes its display contents in correspondence with the movement of a user's head, an image range must be large enough to cover the movement of the head. Therefor, required capacity of an image memory is large. Furthermore, since the head-mount display extracts the display contents to be displayed from the image memory and changes its extracting portion in correspondence with the movement of the head, high access speed is required. Therefore, to display a natural and real image corresponding to the head movement by using the conventional head-mount display, the system scale has to be large and complex.

In the case of the CG system which generates an image corresponding to the head movement by a calculation, an image cannot be displayed in real time due to a heavy calculation load, resulting in unnatural images which are intermittently displayed frame by frame. In this case, since a special-purpose processor and circuit are required, the cost increases, and the apparatus scale increases.

In recent years, large-screen, three-dimensional video systems have become popular. In contrast to this, an apparatus for observing an image is required to attain size and weight reductions. As a display apparatus which satisfies such requirements, spectacle- and helmet-type head-mount display apparatuses have been developed.

Each of these apparatuses comprises compact two-dimensional image display units such as CRTs, liquid crystal displays, or the like corresponding to the right and left eyes, and a user wears such an apparatus on his or her head or face to project images displayed on these image display units onto the retinas of the right and left eyes via an optical system. Therefore, such a display apparatus is superior to a stand-alone type display in terms of its space factor and portability.

Also, the above-mentioned display apparatus can also realize a three-dimensional image display since it comprises two display units for the right and left eyes.

However, in the conventional apparatus, the field angle of an image to be displayed is determined by the dimensions of the display units such as CRTs, liquid crystal displays, or the like to be used in the apparatus, and the magnification of the optical system. In order to obtain sufficient reality, a large field angle is generally preferable, but it does not always apply. Each image to be observed has an optimal field angle, and if the field angle of the apparatus is considerably different from the optimal field angle, an observer often feels fatigue. More specifically, upon observation of an image with rapid movement on an excessively large screen, since the movement itself of an image becomes large, the observer must move his or her eyes or face largely, resulting in an increase in fatigue.

Furthermore, in order to solve such a problem, an optical system which can vary its magnification may be used to change the field angle. However, with this arrangement, the optical system itself becomes large in size, and the apparatus scale increases accordingly. For this reason, superiority such as compactness, light weight, and the like, of the head-mount display apparatus to the stand-alone type display is lost.

SUMMARY OF THE INVENTION

The present invention has been made in consideration of the above-mentioned problems, and has as its object to provide a display apparatus and its control method, which can attain a natural display in real time in correspondence with the movement of a head even under the condition of a limited memory capacity.

It is another object of the present invention to provide a display apparatus and its control method, which can prevent the display state from oversensitively responding to an unnecessary movement of the head of an observer, and can reduce the fatigue of the observer.

It is still another object of the present invention to provide a display apparatus and its control method, which can limit the change direction of the display state in correspondence with the purpose of use and display contents of a head-mount display apparatus, and the observer's favor to effectively obtain reality, and to reduce the fatigue of the observer.

It is still another object of the present invention to provide a display apparatus and its control method, which can automatically control the limitation on the change direction of the display state on the basis of video data supplied to a head-mount display apparatus, and allow an observer to easily enjoy video effects that a video creator intended.

It is still another object of the present invention to provide a display apparatus and its control method, which can change the field angle of an image to be displayed without increasing the size of an optical system in display units which are respectively disposed at the observation positions of the right and left eyes.

It is still another object of the present invention to provide a display apparatus and its control method, which can automatically realize a display at an optimal field angle in correspondence with each image input to the display apparatus.

It is still another object of the present invention to provide a display apparatus and its control method, which allow an observer to easily synthesize right and left images by changing the positions of images to be displayed on right and left display units.

It is still another object of the present invention to provide a display apparatus and its control method, which allow an observer to observe an image under an optimal condition associated with the field and convergence angles by automatically displaying an image at an optimal position in correspondence with each image input to the display apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a block diagram showing the arrangement of a display apparatus according to the third embodiment of the present invention;

DETAILED DESCRIPTION OF THE PREFERRED EMBODIMENTS

Preferred embodiments of the present invention will now be described in detail in accordance with the accompanying drawings.

[First Embodiment]

Figure 1:
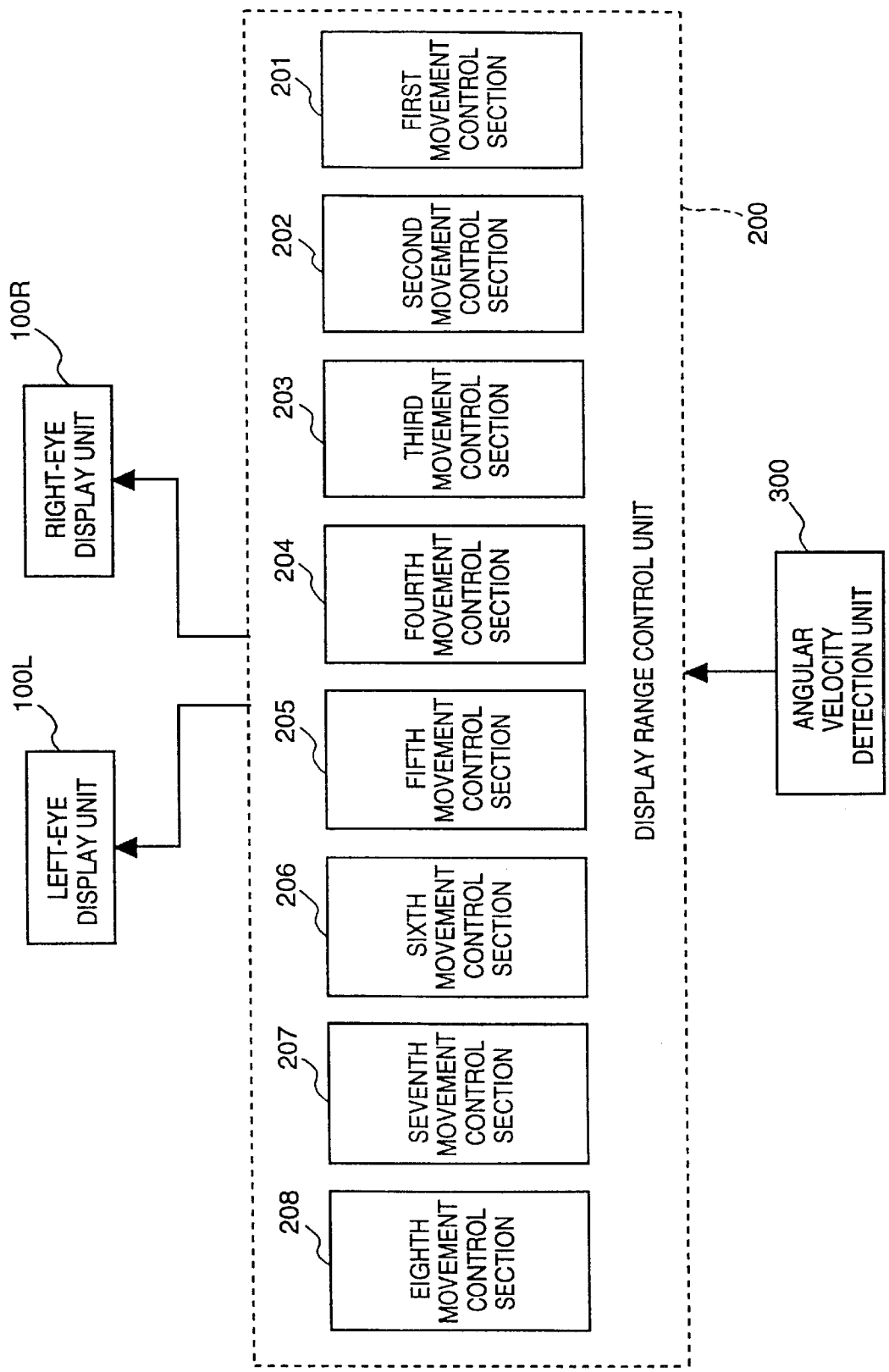
FIG. 1 is a block diagram showing the arrangement of the principal part of a head-mount display apparatus according to the first embodiment of the present invention.

FIG. 1 is a schematic block diagram showing the arrangement of a head-mount display apparatus of this embodiment. Referring to FIG. 1, reference numeral 100L denotes a left-eye display unit; and 100R, a right-eye display unit. Reference numeral 200 denotes a display range control unit; and 300, an angular velocity detection unit for detecting the movement of the head of an observer.

The left-eye display unit 100L corresponds to that of a liquid crystal monitor 1L (to be described later), and the right-eye display unit 100R corresponds to that of a liquid crystal monitor 1R (to be described later) (see FIG. 2). The display range control unit 200 displays first and second image display ranges A and B (see FIGS. 3A and 3B) on the display units 100L and 100R. Furthermore, the display range control unit 200 changes the positions of the first and second image display ranges A and B relative to each other on the basis of the angular velocity displacement obtained when the apparatus is fixed on the head of an observer. Note that the control unit 200 will be described in detail later.

The display range control unit 200 of this embodiment comprises a first movement control section 201, a second movement control section 202, a third movement control section 203, a fourth movement control section 204, a fifth movement control section 205, a sixth movement control section 206, a seventh movement control section 207, and an eighth movement control section 208.

The first movement control section 201 controls to move the position of the first image display range A in only the horizontal directions within the screens of the display units 100L and 100R.

The second movement control section 202 controls to move the position of the first image display range A in only the vertical directions within the screens of the display units 100L and 100R.

The third movement control section 203 controls to change the size of the first image display range A, to change the magnification of an image displayed within the first image display range A, and not to change the central position of the first image display range A.

The fourth movement control section 204 controls to move the position of the first image display range A in only the horizontal or vertical direction within the screens.

The fifth movement control section 205 controls to move the position of the first image display range A in the vertical direction within the screens of the display units 100L and 100R, to change the size of the first image display range A, and to change the magnification of an image displayed within the first image display range A.

The sixth movement control section 206 controls to move the position of the first image display range A in the horizontal direction within the screens of the display units 100L and 100R, to change the size of the first image display range A, and to change the magnification of an image displayed within the first image display range A.

The seventh movement control section 207 controls to move the position of the first image display range A in the horizontal or vertical direction within the screens of the display units 100L and 100R, to change the size of the first image display range A, and to change the magnification of an image displayed within the first image display range A.

The eighth movement control section 208 controls to inhibit the position of the first image display range A from being changed, to inhibit the size of the first image display range A from being changed, and to inhibit the magnification of an image to be displayed within the first image display range A from being changed.

In this embodiment, the functions of the above-mentioned movement control sections 201 to 208 are realized in a software manner by controlling the setting states of a pointer 33, an address controller 40, a timing signal generator 26, and the like using a display controller (CPU) 21, as will be described later with reference to FIG. 4. However, the movement control sections may be realized in a hardware manner.

In the head-mount display apparatus of this embodiment with the above arrangement, the movement control sections 201 to 208 operate in various operation modes in correspondence with the detection output from the angular velocity detection unit 300. The arrangement and operation of the head-mount display apparatus of this embodiment will be described in detail below.

Figure 2:
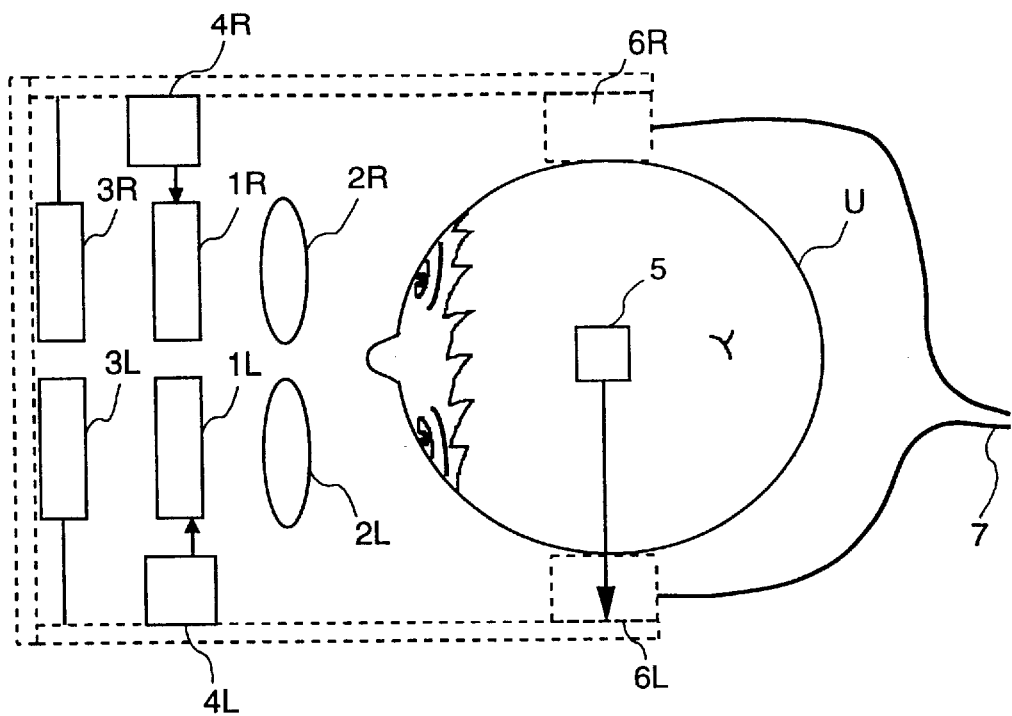
FIG. 2 is a block diagram of display units to be mounted on a head in the first embodiment.

FIG. 2 is a block diagram showing the detailed arrangement of the display units of the head-mount display apparatus of this embodiment.

Referring to FIG. 2, reference numerals 1R and 1L denote liquid crystal monitors for displaying images; and 2R and 2L, enlargement optical systems through which an observer observes images on the display units of the liquid crystal monitors 1R and 1L in an enlarged scale. Reference numerals 3R and 3L denote backlights for illuminating the liquid crystal monitors 1R and 1L from the back side. Reference numerals 4R and 4L denote liquid crystal drivers used for displaying video signals on the liquid crystal monitors 1R and 1L as images.

Reference numeral 5 denotes an acceleration sensor for detecting the acceleration of the head-mount display apparatus. The sensor 5 constitutes the above-mentioned angular velocity detection unit 300. Reference numerals 6R and 6L denote loudspeakers for producing sounds to an observer U based on audio signals. Reference numeral 7 denotes cables used for communicating video signals, audio signals, and other control signals with a remote display apparatus shown in FIG. 4. Note that a portion indicated by broken lines is a housing which constitutes a main body and is to be mounted on the head of the observer U.

A method of displaying images on the display units of the head-mount display apparatus of this embodiment will be explained below.

Figure 3A:
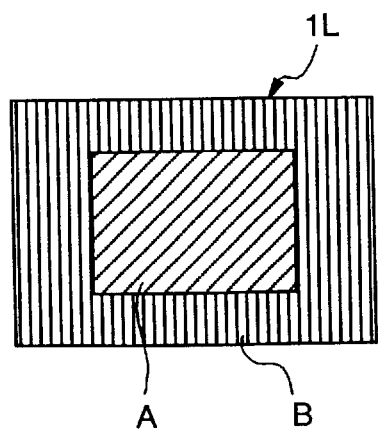
FIGS. 3A and 3B are views for explaining the display regions of display units 1 and 2 of the first embodiment.
Figure 3B:
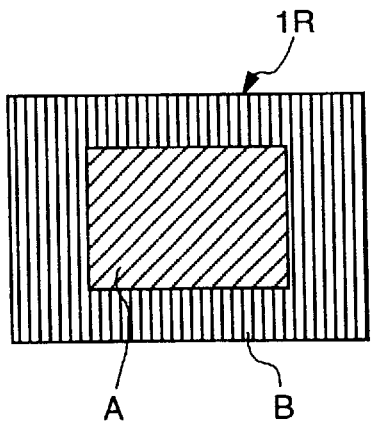

FIGS. 3A and 3B are explanatory views of the display regions of the display units of the liquid crystal monitors 1L and 1R. FIG. 3A is a view for explaining the display screen of the liquid crystal monitor 1L, i.e., the display screen for the left eye of the observer. FIG. 3B is a view for explaining the display screen of the liquid crystal monitor 1R, i.e., the display screen for the right eye of the observer. In FIGS. 3A and 3B, a portion hatched by oblique lines corresponds to the first image display range A, and a portion hatched by vertical lines corresponds to the second image range B.

Figure 4:
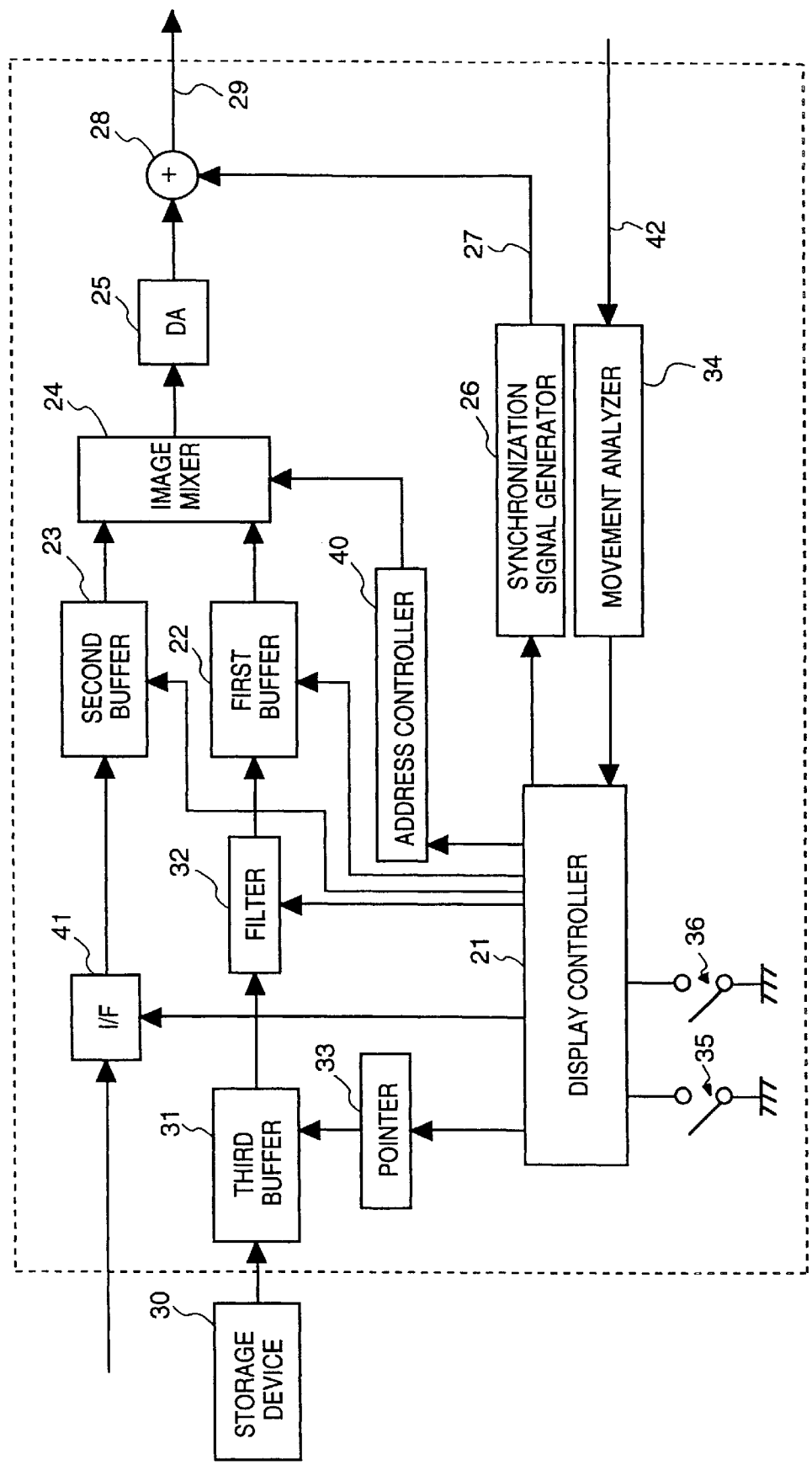
FIG. 4 is a block diagram of a display control unit of the first embodiment.

FIG. 4 is a block diagram showing the arrangement of the display control unit. Referring to FIG. 4, reference numeral 21 denotes a display controller which changes the relative positional relationship between and the sizes of the first and second image display ranges A and B, and the display contents of an image within the first or second image display range A or B in correspondence with the output from the acceleration sensor 5.

Reference numeral 22 denotes a first buffer for temporarily storing image data for the first image display range A; and 23, a second buffer for temporarily storing an image to be displayed on the image display range B. Reference numeral 24 denotes an image mixer for mixing image data read out from the first and second buffers 22 and 23. Reference numeral 25 denotes a D/A converter for converting a digital signal output from the image mixer 24 into an analog signal.

Reference numeral 26 denotes a synchronization signal generator for generating a synchronization signal 27 corresponding to a television system for displaying an image on each liquid crystal panel. Reference numeral 28 denotes an adder for adding the D/A-converted image data and the synchronization signal 27. Reference numeral 29 denotes a composite video signal consisting of the image data and the synchronization signal 27.

Reference numeral 30 denotes a storage device for storing image data to be displayed. The storage device 30 comprises a storage medium such as a tape, an image memory, a hard disk, a CD-ROM, or the like. Reference numeral 31 denotes a third buffer for storing image data for several fields read out from the storage medium.

Reference numeral 32 denotes a filter which comprises, e.g., an arithmetic operation unit for enlarging/reducing an image to be displayed and performing filter processing within the screen or in the time-base direction. Reference numeral 33 denotes a pointer for designating an image to be read out from the third buffer 31.

Reference numeral 34 denotes a movement analyzer for analyzing the movement of the head-mount display apparatus mounted on the head upon reception of a detection signal 42 from the acceleration sensor 5. Reference numeral 35 denotes an operation mode setting switch (mode switch); and 36, a reset switch. Reference numeral 40 denotes an address controller for designating the position and size of the first image display range A. Reference numeral 41 denotes an interface which has a function of switching if data to be displayed on the second image display range B is received from an external device or is set by the controller 21, and a buffer function.

Note that some or all the components of the arrangement shown in the block diagram of FIG. 4 may be arranged in a head-mount unit. However, in this embodiment, in order to reduce the weight and size of the head-mount unit, the display control unit shown in FIG. 4 is constituted independently of the head-mount unit, and is stored in a pocket of the observer or attached to the belt of the observer.

The operation based on the above-mentioned arrangement will be described below. For the sake of simplicity, the system of this embodiment is assumed to operate under the following conditions.

Assume that a moving picture recorded in the storage device 30 is displayed on the first image display range A. Therefore, the controller 21 has already read out data of the contents to be displayed on the first image display range A from the storage device 30 at a required timing, and the readout data has already been transferred to the third buffer 31.

When data is compressed by, e.g., an MPEG method and is recorded in the storage device 30, data has already been subjected to required processing such as decoding corresponding to the recording method by predetermined means (not shown). Since this embodiment does not directly relate to this point, a detailed description thereof will be omitted.

An appropriate monochrome background image of the first image display range A is displayed on the second image display range B. Alternatively, panels for characters or operations may be displayed on the second image display range B by a setting operation of the display controller 21 via the interface 41. More specifically, the display controller 21 can change data to be displayed on the second image display range B by rewriting data in the second buffer 23.

In this embodiment, an image can be stereoscopically observed using the display units of the two liquid crystal monitors 1R and 1L of the head-mount display apparatus. In the case of stereoscopic viewing, the right and left display images must have a parallax therebetween. In this case, the apparatus has two systems of the circuits shown in the block diagram of FIG. 4 except for some components such as the display controller 21, the operation mode setting switch 35, the reset switch 36, and the like, and images photographed to have a parallax are stored in advance in the storage device 30, or parallax images may be generated by a CG technique using predetermined means (not shown).

As described above, this embodiment can be applied to stereoscopic viewing. However, in this case, the same image is displayed on the display screens of the two liquid crystal monitors 1R and 1L for the sake of simplicity, and the operation of only one of the right and left systems will be described. Also, the power supply of the entire head-mount display apparatus system is turned on in advance.

Figure 5:
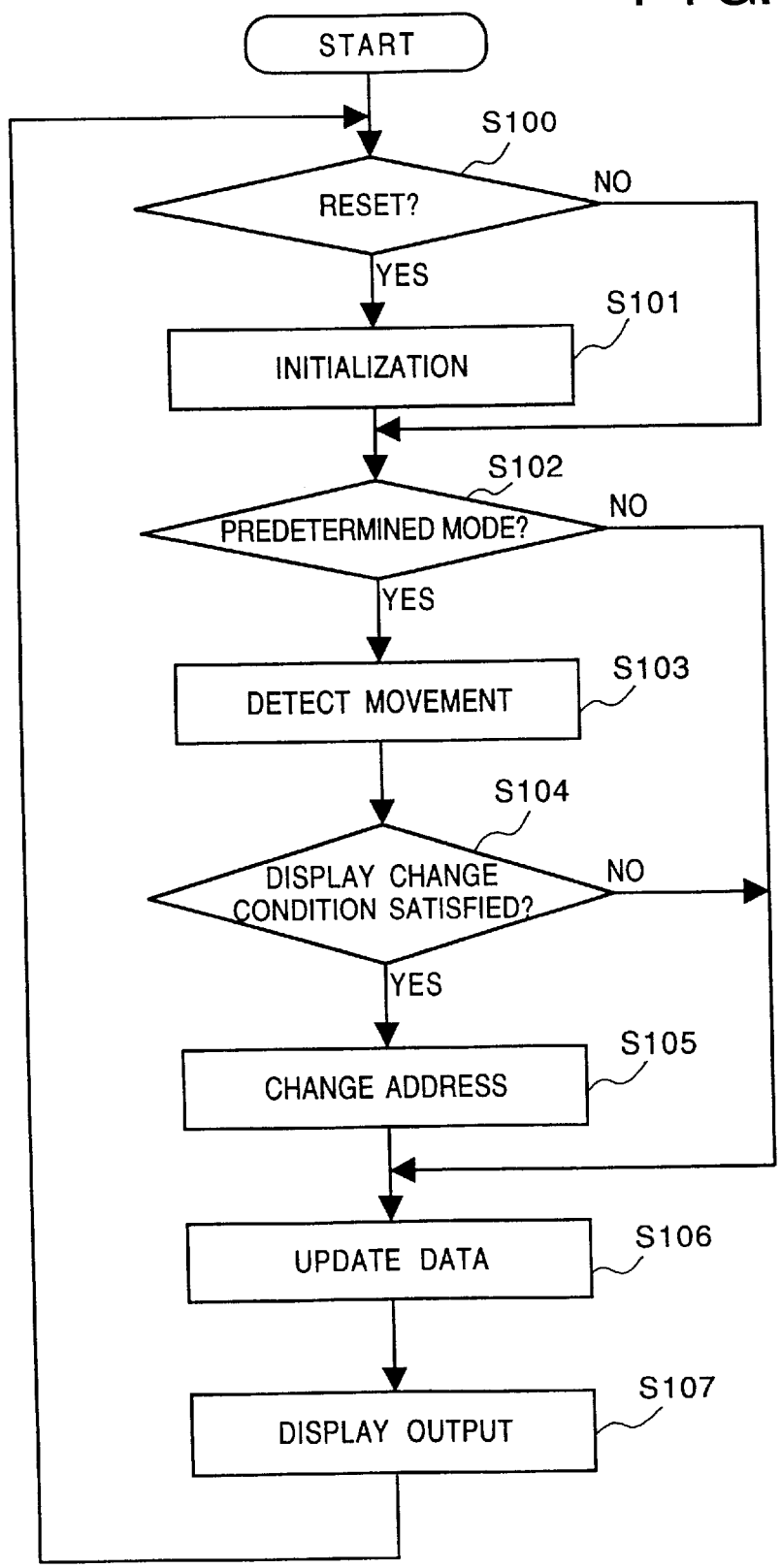
FIG. 5 is a flow chart for explaining the operation of the first embodiment.

The operation of the head-mount display apparatus of the embodiment shown in FIGS. 3A to 4 will be described below with reference to the flow chart in FIG. 5.

In step S100, the state of the reset switch 36 is detected. If the reset switch 36 is in a reset state, the position and size of the first image display range A are set in an initial state in step S101.

Figure 6:
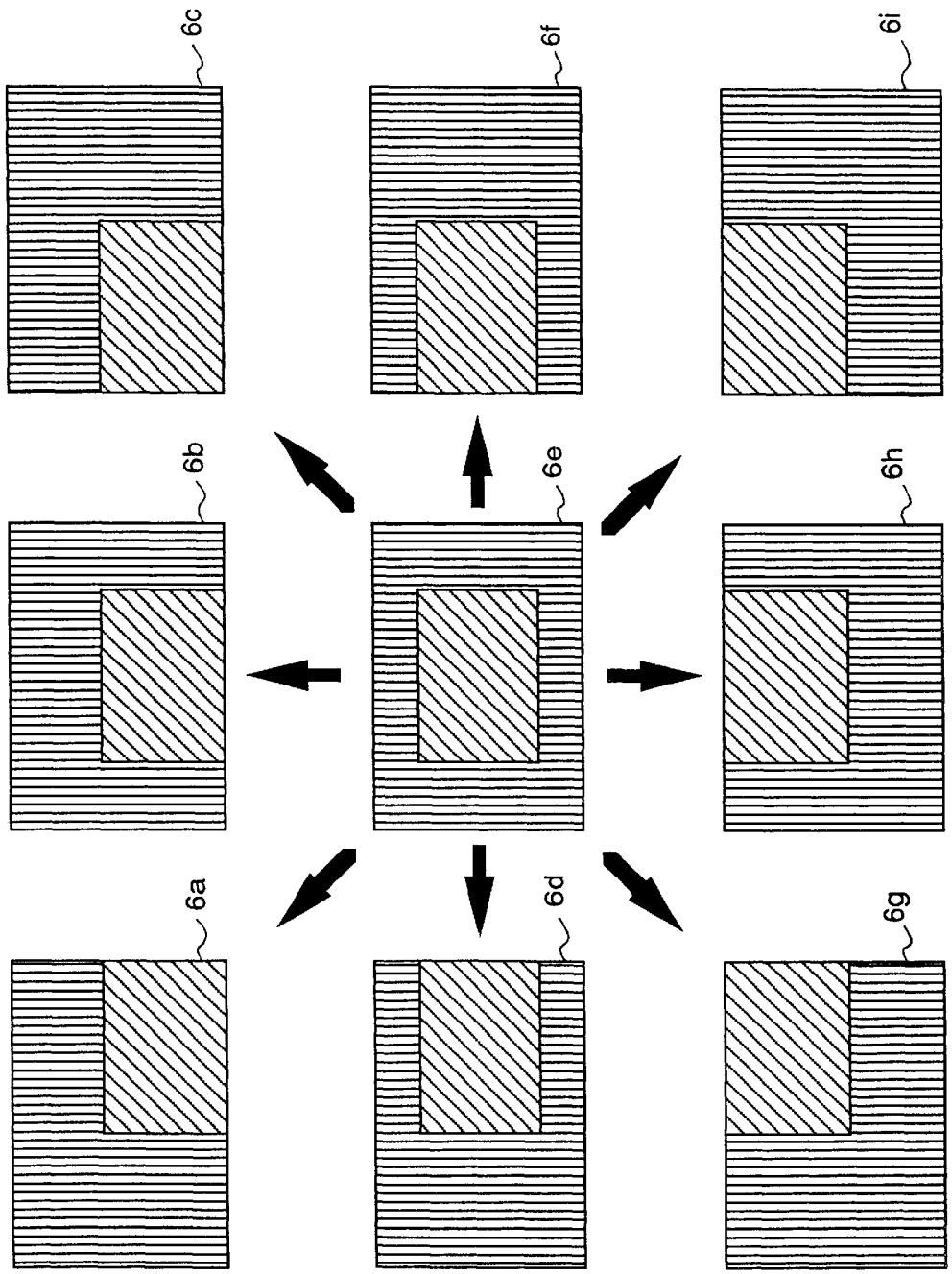
FIG. 6 is a view showing the relationship between the head movement and the corresponding image to be displayed.

In this state, as indicated by a portion hatched by oblique lines in 6e of FIG. 6, the position of the first image display range A is set at the center of the entire display screen, and its size is set to be slightly smaller than the entire size. This initialization is also performed automatically after the power supply is turned on.

Figure 7:
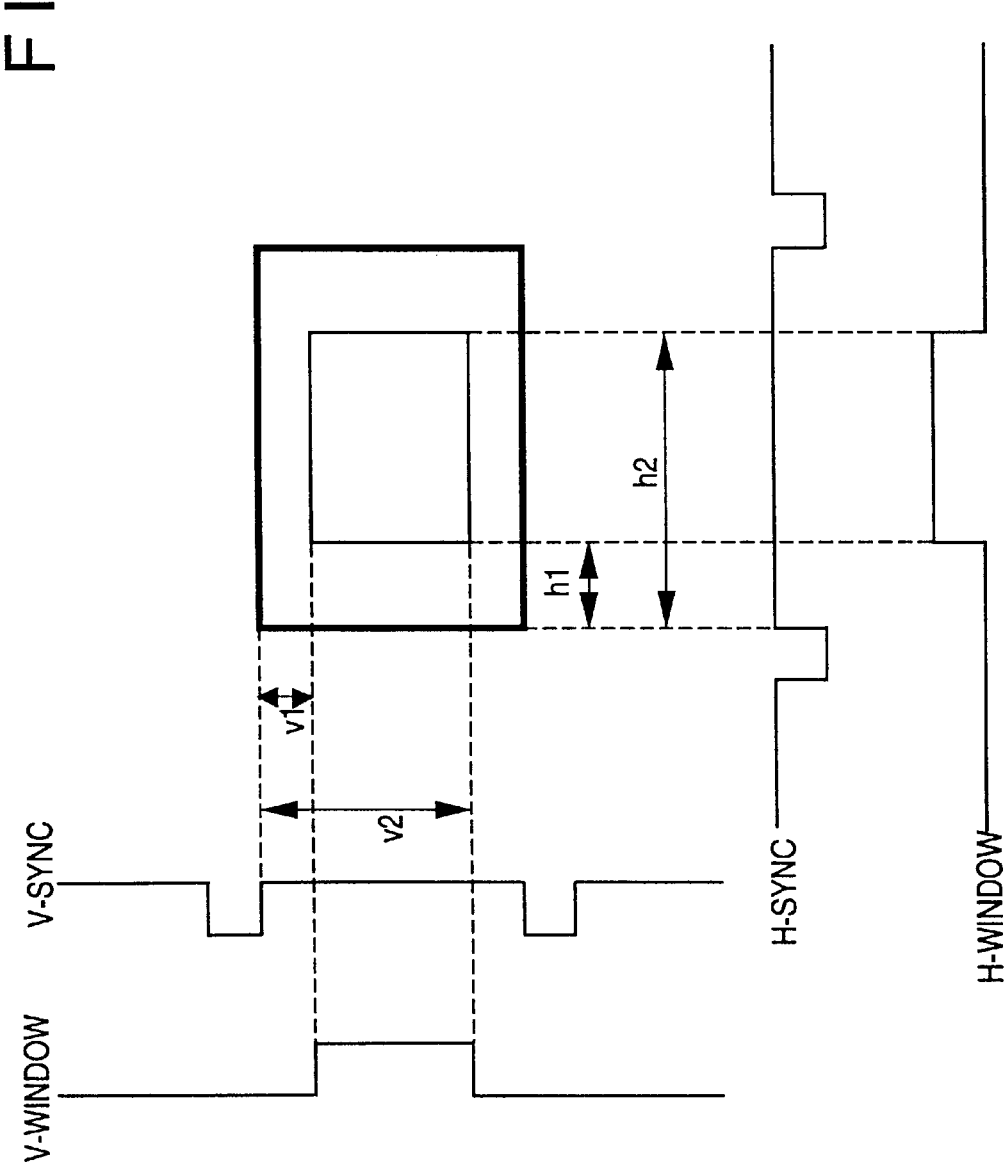
FIG. 7 is a timing chart for explaining the timing signal of an address controller 40.

The initialization will be described in more detail below. The address controller 40 outputs timing signal pulses V-WINDOW and H-WINDOW to the image mixer 24, as shown in FIG. 7. The mixer 21 supplies image data from the first buffer 22, i.e., moving picture data read out from the storage device 30 to the D/A converter 25 while the pulse H-WINDOW is at High level (a period h2–h1) and the pulse V-WINDOW is at High level (a period v2–v1). On the other hand, when one of the pulses H-WINDOW and V-WINDOW is at Low level, the mixer 21 supplies image data from the second buffer 23, i.e., background image data to be displayed on the second image display range B, to the D/A converter 25.

An image signal which is mixed by the image mixer 24 and is converted into an analog signal by the D/A converter 25 is added with the synchronization signal 27 by the adder 28, thus obtaining a composite video signal. The video signal is displayed on the display units of the liquid crystal monitors 1R and 1L, as shown in 6e of FIG. 6.

In order to output the above-mentioned pulses H-WINDOW and V-WINDOW to the address controller 40, the display controller 21 outputs periods h1 and h2 as H-WINDOW address signals to the address controller 40, and outputs periods v1 and v2 as V-WINDOW address signals to the address controller 40.

In step S102, the state of the mode switch 35 is checked. More specifically, it is checked which one of a plurality of display modes (to be simply referred as a mode hereinafter) is set. As a method of setting a mode, a display for selecting a mode is made on the display unit, and the designated mode may be determined on the basis of the number of times of depression of the mode switch 35. Alternatively, a plurality of mode switches may be arranged in correspondence with the plurality of modes.

In the following description, a first mode controlled by the first movement control section 201 will be referred to as a predetermined mode. More specifically, in the predetermined mode, the position of the first image display range A moves in only the horizontal direction within the screen.

When the operation mode is not the predetermined mode, the position of the first image display range A is inhibited from being changed, the size of the first image display range A is inhibited from being changed, and the magnification of an image displayed within the first image display range A is inhibited from being changed. More specifically, the apparatus operates in an eighth mode controlled by the eighth movement control section 208.

In this manner, if the operation mode is the predetermined mode (first mode), the flow advances to step S103 and the subsequent steps. On the other hand, if the operation is not the predetermined mode (eighth mode), the flow advances to step S106. If the operation mode is the predetermined mode (first mode), the flow advances to step S103, and the acceleration sensor 5 starts detection of any head movement. Thus, when the observer turns his or her head or body, the acceleration sensor 5 detects the amount and direction of the displacement of the head-mount display apparatus, and outputs the detection result to the movement analyzer 34 as displacement information of the head-mount display apparatus.

The movement analyzer 34 calculates a motion vector v on the basis of the input displacement information. Since the method of calculating the motion vector can use a known method conventionally used in the VR technique, a detailed description thereof will be omitted.

In step S104, it is checked based on the motion vector information from the movement analyzer 34 if the display position, size, and the like of the first image display range A need be changed. For example, the motion vector information is expressed by decomposing a direction vector in orthogonal X-, Y-, and Z-axis components. Let vx, vy, and vz be the X-, Y-, and Z-axis components of the motion vector.

Furthermore, maximum and minimum values (vxmax, vxmin), (vymax, vymin), and (vzmax, vzmin) are set in advance in units of components, and it is checked if the respective components vx, vy, and vz fall within the ranges defined between their maximum and minimum values. If the respective components fall within these ranges, it is determined that condition 1 is satisfied.

Furthermore, maximum and minimum difference values (xymax, xymin), (yzmax, yzmin), and (zxmax, zxmin) are set in advance for the differences (vx–vy, vy–vz, vz–vx) between the respective components, and it is checked if the differences between the respective components fall within the ranges defined between their maximum and minimum difference values. If the differences fall within these ranges, it is determined that condition 2 is satisfied.

As described above, it is checked in step S104 using the predetermined maximum values, minimum values, maximum difference values, and minimum difference values if the motion vector information satisfies conditions 1 and 2. If the motion vector information satisfies these conditions, the flow advances to step S105 to calculate the position of the first image display range A in correspondence with the direction and size of the motion vector information. On the contrary, if the motion vector information does not satisfy conditions 1 and 2 above, and the movement is smaller then the respective minimum values, it is determined that the observer does not want to change the field of view, i.e., the first image display range A need not be changed, and the flow advances to step S106. Also, even when the conditions are not satisfied, if a movement exceeding the maximum values is detected, the flow advances to step S105.

In step S105, in order to change the first image display range A, new addresses are output to the display address controller 40. Therefore, when the observer moves his or her head to the left by a given amount, the position of the first image display range A shifts by a field angle corresponding to the given amount. As a result, the positional relationship between the first and second image display ranges A and B is as shown in 6d of FIG. 6.

In this case, the display position is changed as in the above-mentioned initialization. More specifically, the display controller 21 can output new H-WINDOW and V-WINDOW address signals to the address controller 40.

When a movement exceeding either one of the maximum values of conditions 1 and 2 above is detected, the display position is changed within an allowable range.

In step S106, the display state within the first image display range A and the display state within the second image display range B (if necessary) are updated. Thereafter, the flow returns to step S100 to repeat the above-mentioned operation. In particular, when a moving picture is displayed in the first image display range A, the display state is updated in step S106.

FIG. 6 shows a change in displayed image in correspondence with the head movement. FIG. 6 shows the screen states corresponding to movements of the head of the observer U of the head-mount display apparatus of this embodiment in the directions of arrows in FIG. 6 to have 6e of FIG. 6 as an initial position. When the apparatus is controlled in the first mode like in this embodiment, the first image display range A moves in only the directions of 6d and 6f of FIG. 6 to have 6e of FIG. 6 as an initial position.

Figure 8:
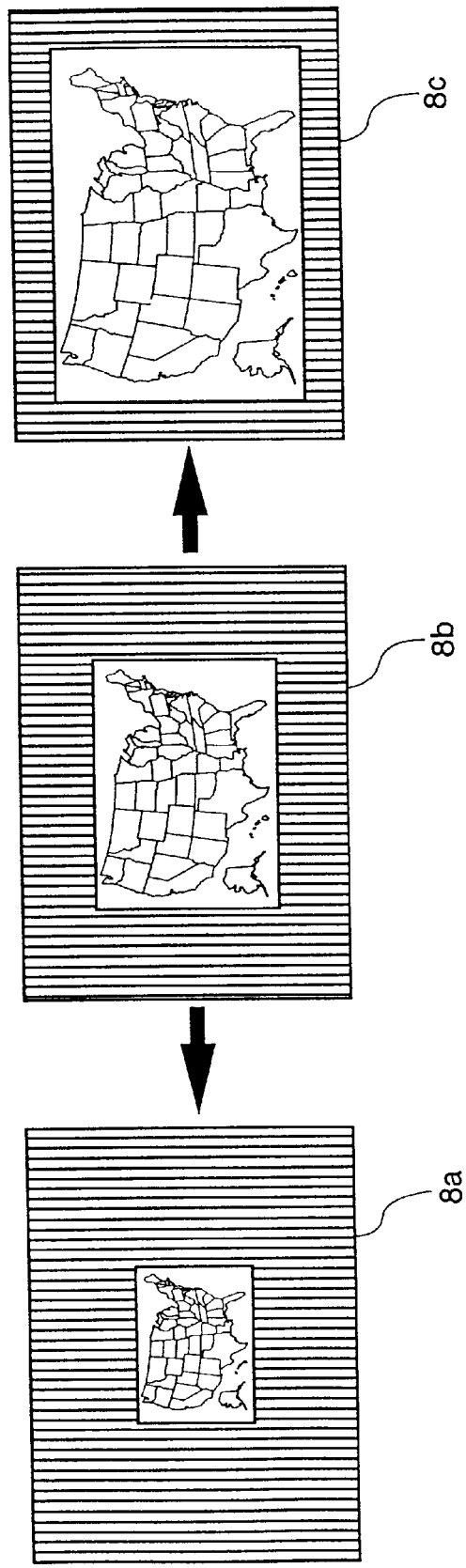
FIG. 8 is a view showing the relationship between the head movement in the back-and-forth direction and the corresponding image to be displayed.
Figure 9:
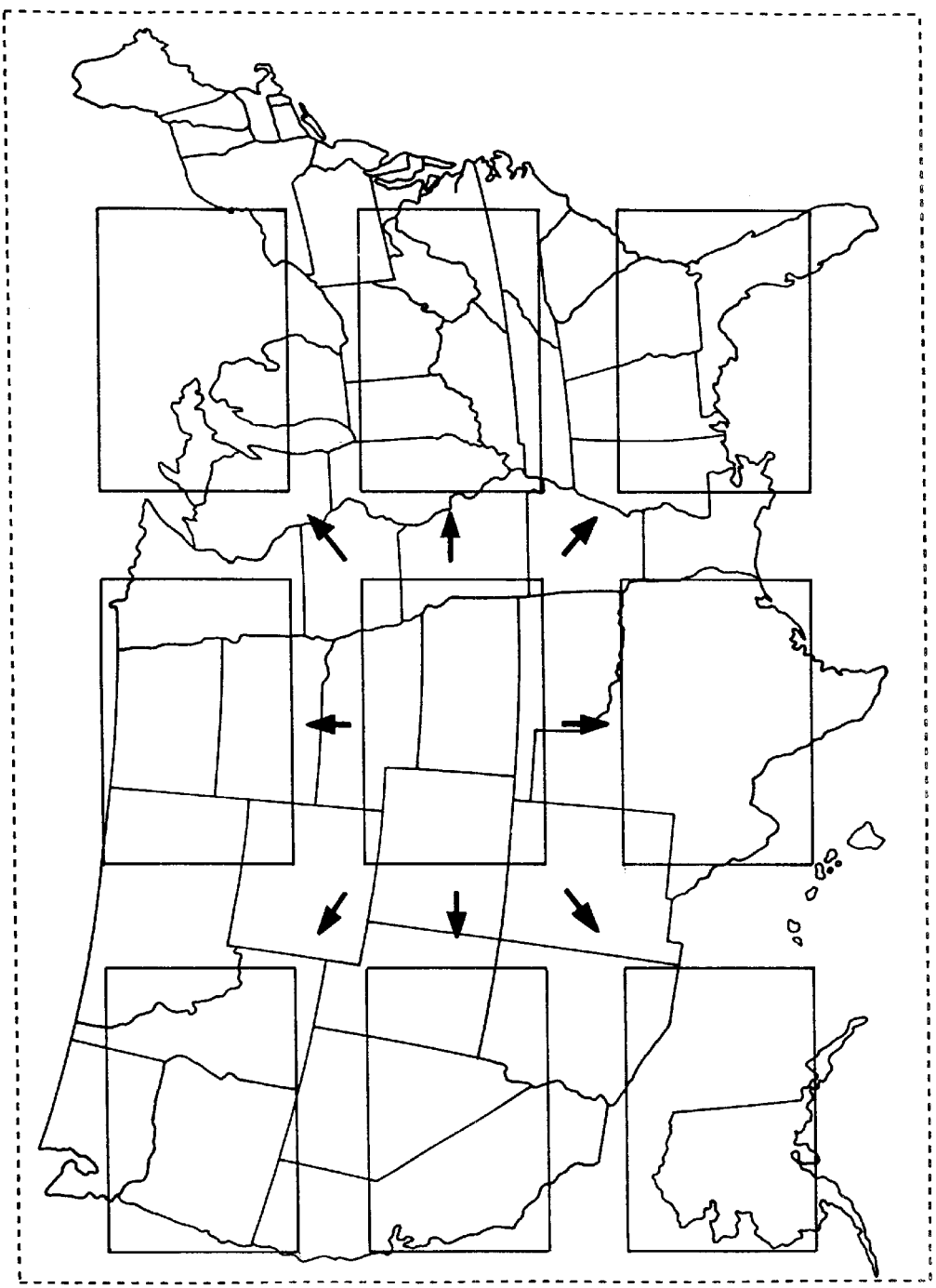
FIG. 9 is a view for explaining an example of the movement of the display region.

FIG. 8 shows an example upon detection of the movement of the observer's head in the back-and-forth direction when the observer moves from the initial position in the back-and-forth direction. This example corresponds to a case wherein the observer moves his or her face in a direction to approach or separate from the monitor screen when he or she observes a normal television monitor which is not mounted on the head.

Therefore, when the observer moves his or her head forward to have 8b of FIG. 8 as an initial position, the size of the first image display range A increases, as shown in 8c of FIG. 8, and an image displayed within the first image display range A is enlarged in correspondence with the enlargement factor of the range A. On the contrary, when the observer moves his or her head backward, the size of the first image display range A decreases, as shown in 8a of FIG. 8, and an image displayed within the first image display range A is reduced in correspondence with the reduction factor of the range A.

The enlargement/reduction control of the image displayed within the first image display range A is realized by inputting a coefficient corresponding to the enlargement/reduction factor from the display controller 21 to the filter 32.

As another mode, when the change in display position is limited to only the vertical direction in response to the head movement of the observer, the screen does not respond even when the head moves in the horizontal direction, and the position of the first image display range A moves under the condition that the vertical component of the motion vector is equal to or larger than a predetermined amount, and differences from components in other directions are equal to or larger than predetermined amounts. More specifically, when the observer moves his or her head upward in FIG. 6 to have 6e of FIG. 6 as an initial position, a state shown in 6b of FIG. 6 is obtained; when the observer moves his or her head downward, a state shown in 6h of FIG. 6 is obtained.

The limitation on the moving direction can be adjusted by changing the above-mentioned setting values such as the maximum and minimum values of the respective components, the maximum and minimum difference values of the differences between the respective components, and the like. Similarly, the change directions may be limited to only other directions (e.g., oblique directions) in response to the head movement of the observer.

As described above, according to the first embodiment, the position and size of the first image display range A can be changed in correspondence with the motion vector of the head movement of the observer. In FIG. 6, the relationship between the head movement and the change in screen has been explained using eight representative directions. However, in practice, the display range may move further finely in correspondence with the moving direction of the head.

Furthermore, the moving amount of the first image display range A can be finely set in correspondence with the actual moving amount of the head. Similarly, the display magnification factor, i.e., the enlargement/reduction factor of the first image display range A can be finely changed in correspondence with the actual moving amount of the head.

In this embodiment, the first image display range A has a size and position shown in 6e of FIG. 6 in an initial state. However, the size and position of the display range A in the initial state may be arbitrarily set. In this case, the size and position of the display range A in the initial state can be appropriately set in correspondence with each use situation.

As another embodiment, an appropriate mode may be automatically selected in correspondence with the type of image to be observed. For this purpose, a control code for selecting a mode may be added to video data, and the control unit may read this control code to select a display mode. Note that the control code may be superposed on the blanking period (e.g., the vertical blanking period) of a video signal.

In this manner, since the observer can observe an image by automatically selecting a display method that a video creator intended, he or she can enjoy a photographing effect that the video creator intended without requiring any complex operations. In the first embodiment, the angular velocity detection unit 300 detects the head movement of the observer. Alternatively, the head movement detection may be attained by detecting the angle of the head of the observer.

As described above, according to the first embodiment, the display positions of the first and second image display ranges A and B change relative to each other in correspondence with the displacement information of the head obtained by the angular velocity detection unit 300. For this reason, even when the head movement is large, and the memory capacity is limited, a natural display corresponding to the head movement can be realized.

The conventional head-mount display apparatus extracts and displays a portion of an image, and changes the extraction position in correspondence with the movement of the head. For this reason, an image which is large enough to cover the movement range of the head must be prepared, resulting in an increase in memory capacity.

Figure 17A:
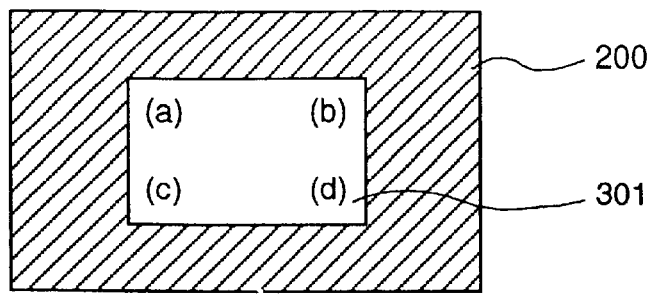
FIGS. 17A to 17C are explanatory views of a display method in a conventional head-mount display apparatus.

For example, a case will be examined below wherein a region 301 (to be referred to as a small region 301 hereinafter) smaller than a display range 200 of the display apparatus is displayed at the center of the screen, and a predetermined image is displayed in the background (hatched portion), as shown in FIG. 17A.

Figure 17B:
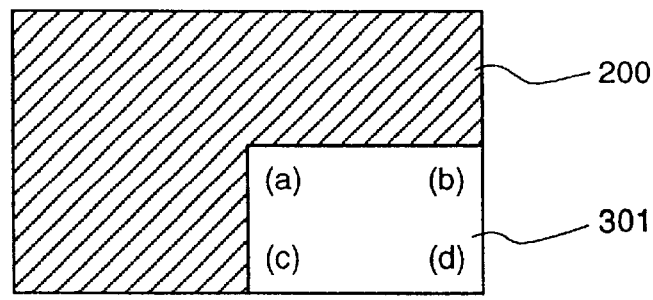

In this state, assume that a user moves his or her head obliquely leftwardly to see an upper left portion (a) of the image displayed on the small region. The head-mount display apparatus detects this movement of the head, and changes the display state. As a result, as shown in FIG. 17B, the display state is changed so that the small region 301 moves to the lower right position, and the portion (a) is located at substantially the center of the display range 200.

Figure 17C:
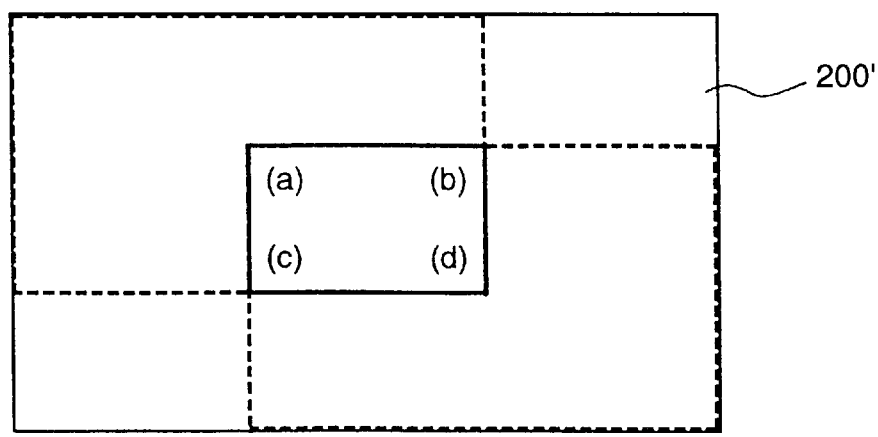

When a small region 301 in FIG. 17A is moved within a display range 200, the conventional head-mount display apparatus requires image data 200' in a large area, as shown in FIG. 17C. In addition, since an image is extracted and displayed in correspondence with the movement of the head, high-speed processing is required. In contrast to this, according to this embodiment, different image data are used for the background (hatched portion) displayed in the display range 200 and the small region 301, and the display position of the small region 301 is changed in correspondence with the movement of the head. For this reason, image data required in this embodiment are image data for the background of the display range 200, and image data of the small region 301, and are smaller than the image data 200' shown in FIG. 17C.

Since the display position of the small region 301 is changed by controlling the timings of the pulses H-WINDOW and V-WINDOW in FIG. 7 in correspondence with the movement of the head, an image need not be extracted from an image memory. For this reason, no high-speed access to the image memory is required as compared to the prior art. For this reason, even when a moving picture is displayed on the first image display range A of this embodiment, its display position can be changed without impairing the display state of the moving picture.

Since the apparatus of this embodiment requires only a lighter load than that in a CG (COMPUTER GRAPHICS) system for calculating and generating an image corresponding to movement in correspondence with the head movement of an observer, images can be displayed in real time, and can be prevented from being intermittently displayed frame by frame. For these reasons, since neither a special-purpose processor nor circuit need be arranged, a low-cost apparatus can be realized, and an increase in apparatus scale can be prevented.

Furthermore, since the display state does not change unless the moving amount of the head reaches a predetermined amount, the display state can be prevented from oversensitively responding to an unnecessary movement of the head, thus reducing the fatigue of the observer.

Moreover, since a plurality of different movement control sections for limiting the movement of the display state in response to the head movement of the observer are arranged, the movement control sections can be optimally and selectively used in correspondence with the purpose of use of the head-mount display apparatus or the observer's favor. Therefore, reality can be obtained more effectively, and the fatigue of the observer can be further reduced.

In addition, when a desired mode is automatically set in accordance with the mode selection control code added to video data, a display method that a video creator intended can be automatically selected. Therefore, the observer can enjoy a unique photographing effect that the video creator intended without requiring any complex operations.

[Second Embodiment]

Figure 10:
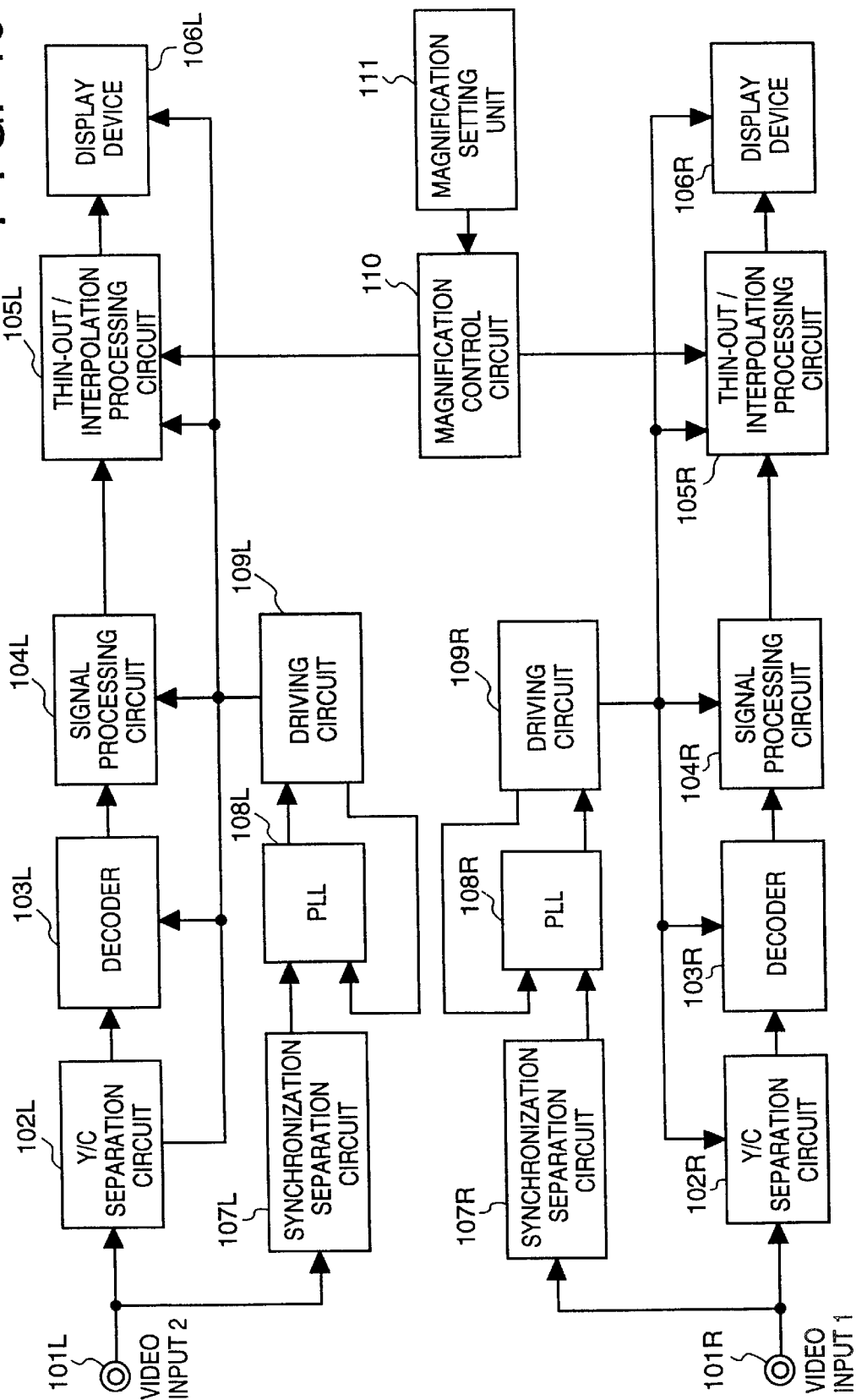
FIG. 10 is a block diagram showing the arrangement of a display apparatus according to the second embodiment of the present invention.

FIG. 10 is a block diagram showing the arrangement of a display apparatus according to the second embodiment. Referring to FIG. 10, reference numerals 101R and 101L denote input terminals of a video signal; 102R and 102L, Y/C separation circuits each for separating a video signal into a luminance signal (Y signal) and a chrominance signal (C signal); 103R and 103L, decoders each for generating R, G, and B, three primary color signals on the basis of the Y and C signals; 104R and 104L, signal processing circuits for performing processing required for displaying R, G, and B signals on display devices; 105R and 105L, thin-out/interpolation processing circuits for performing enlargement/reduction processing of an image; 106R and 106L, display devices comprising, e.g., CRTs, liquid crystal displays (LCDs), or the like; 107R and 107L, synchronization separation circuits each for separating a synchronization signal from a video signal; 108R and 108L, PLL circuits; 109R and 109L, driving circuits for driving the display devices 106R and 106L and respective circuits; 110, a magnification control circuit for controlling the enlargement/reduction factor of the thin-out/interpolation processing circuits 105L and 105R; and 111, a magnification setting unit for setting the magnification of the magnification control circuit 110.

The operation of the display apparatus of the second embodiment will be described below. A video signal input from the video signal input terminal 101R is input to the Y/C separation circuit 102R and the synchronization separation circuit 107R. In the Y/C separation circuit 102R, the video signal is separated into Y and C signals. The Y and C signals are separated into R, G, and B, three primary color signals by the decoder 103R, and the R, G, and B signals are subjected to processing required for displaying these signals on the display device 106R by the signal processing circuit 104R. The R, G, and B signals are subjected to enlargement/reduction processing of an image by the thin-out/interpolation processing circuit 105R, and are supplied to and displayed on the display device 106R.

The magnification control circuit 110 controls the thin-out/interpolation processing circuit 105R to perform enlargement/reduction processing of an image in accordance with the magnification set by the magnification setting unit 111. The detailed arrangement and operation of the thin-out/interpolation processing circuit 105R will be described later.

The synchronization separation circuit 107R separates a synchronization signal from the input video signal. The separated synchronization signal is input to the PLL circuit 108R to form a phase locked loop, thus controlling the driving frequency of the driving circuit 109R. The driving circuit 109R outputs driving pulses of the signal processing circuit, and also outputs pulses for driving the display device 106R.

The same operation as described above is performed in a system constituted by components with a suffix L. Note that the display device 106R is disposed at a position where an image can be seen by only the right eye, and the display device 106L is disposed at a position where an image can be seen by only the left eye. A video signal input from the video input terminal 101R is displayed on the display device 106R, and a video signal input from the video input terminal 101L is displayed on the display device 106L.

Figure 11:
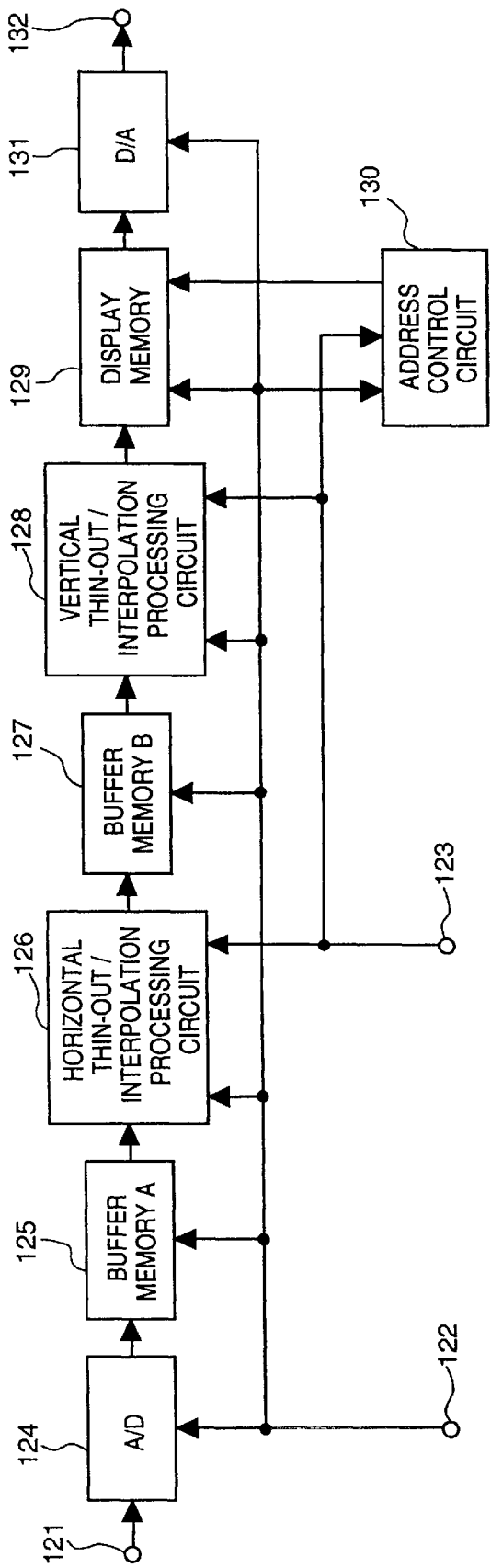
FIG. 11 is a block diagram showing the arrangement of thin-out/interpolation processing circuits 5R and 5L.

FIG. 11 is a block diagram showing the arrangement of the thin-out/interpolation processing circuit 105R and 105L. Referring to FIG. 11, reference numeral 121 denotes an input terminal of a video signal; 122, an input terminal of driving pulses for driving respective internal circuits; and 123, an input terminal of a magnification control signal output from the magnification control circuit 110 to control the magnification factor (enlargement or reduction factor) of an image. Reference numeral 124 denotes an A/D converter for converting an analog signal into a digital signal; 125, a buffer memory A; 126, a horizontal thin-out/interpolation processing circuit for performing thin-out or interpolation processing in the horizontal direction; 127, a buffer memory B; 128, a vertical thin-out/interpolation processing circuit for performing thin-out or interpolation processing in the vertical direction; 129, a display memory; 130, an address control circuit for controlling a read/write access to the display memory 129; 131, a D/A converter for converting a digital signal into an analog signal; and 132, an output terminal of a video signal.

The operation of the thin-out/interpolation processing circuits 105R and 105L will be described below with reference to FIG. 11. A video signal input from the video signal input terminal 121 is converted from an analog signal into a digital signal by the A/D converter 124, and the digital signal is input to the buffer memory A 125. The buffer memory A 125 can store digital data for at least several continuous pixels so as to allow interpolation processing in the horizontal direction. Image data read out from the buffer memory A 125 is subjected to enlargement/reduction processing in the horizontal direction by the horizontal thin-out/interpolation processing circuit 126. More specifically, when an image is to be enlarged in the horizontal direction, interpolation processing between data is performed; when an image is to be reduced in the horizontal direction, data thin-out processing is performed.

The enlargement factor (interpolation ratio) or the reduction factor (thin-out ratio) at that time is controlled by the magnification control signal input from the magnification control signal input terminal 123. The output from the horizontal thin-out/interpolation processing circuit 126 is input to the buffer memory B 127. The buffer memory B 127 can store digital data for at least several continuous lines so as to allow interpolation processing in the vertical direction. Data read out from the buffer memory B 127 is subjected to image enlargement/reduction processing by the vertical thin-out/interpolation processing circuit 128. In this case, image enlargement processing is attained by interpolation processing of data between adjacent lines, and image reduction processing is attained by thin-out processing. The enlargement/reduction factor of this processing is controlled by the magnification control signal input from the magnification control signal input terminal 123.

The output from the vertical thin-out/interpolation processing circuit 128 is input to the display memory 129. The display memory 129 can store data for at least one field. The display memory 129 stores the input data in correspondence with the control signal from the address control circuit 130, so that enlarged/reduced data can be displayed at a predetermined position on the display device 106R.

Figure 12A:
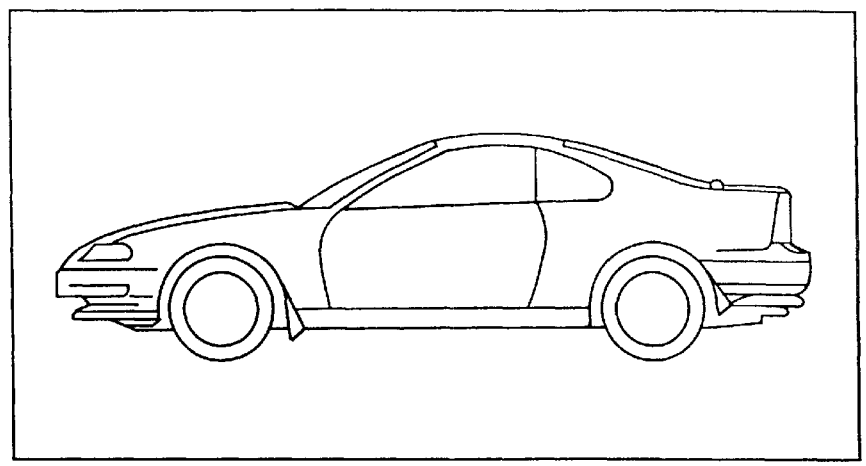
FIGS. 12A to 12C are views showing enlargement processing and reduction processing.
Figure 12B:
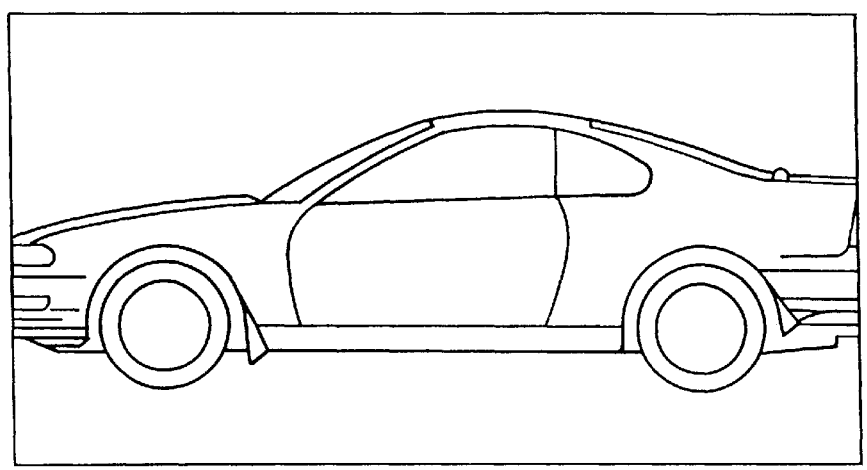
Figure 12C:
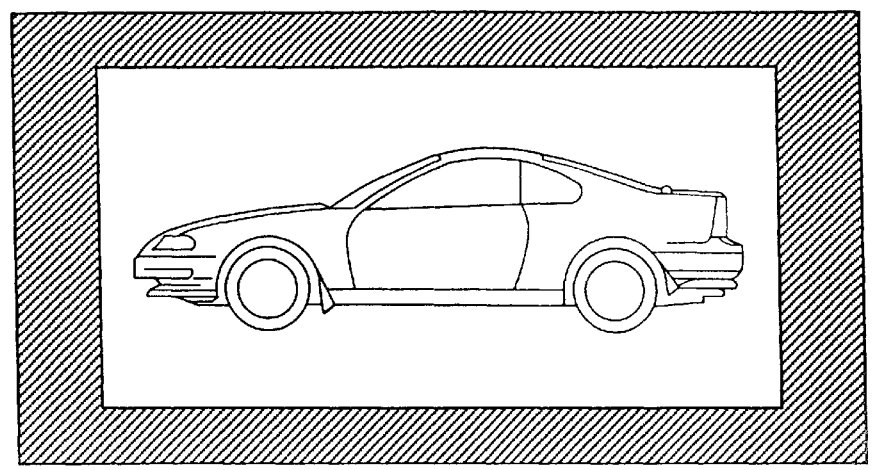

FIGS. 12A to 12C are explanatory views showing the enlargement processing and reduction processing. FIG. 12A shows an original image, and FIG. 12B shows an enlarged image of the original image. In FIG. 12B, data of portions falls outside the display area upon enlargement are not stored in the display memory 129, and only data of the displayable size at the central portion of the image are stored in the display memory 129.

When an image is reduced, reduced image data is stored at the central portion of the display memory 129, as shown in FIG. 12C. In this case, in order to display the enlarged or reduced image at the same positions on the right and left display devices 106R and 106L, the right and left image data are stored at the same addresses on the corresponding display memories 129.

The address control circuit 130 can enlarge or reduce an image to be displayed to various magnification factors by controlling the write address of the display memory 129 in accordance with the magnification factor set by the magnification control signal, and can display images at predetermined positions on the display devices 106R and 106L. Data read out from the display memory 129 is converted from a digital signal into an analog signal by the D/A converter 131, and the analog signal is output from the output terminal 132.

An observer can observe images which are based on video signals input from the input terminals 101R and 101L and displayed on the display devices 106R and 106L. In this case, when an identical signal is input from the two input terminals 101R and 101L, the observer can observe a two-dimensional image. On the other hand, when video signals of the right- and left-eye images of an object, which differ by an amount corresponding to the parallax, are input to the input terminals 101R and 101L, the observer can observe a three-dimensional image. Furthermore, since the observer can observe an image enlarged/reduced to a magnification factor set in the right and left display devices 106R and 106L by setting a desired magnification factor using the magnification setting unit 111, the field angle of an image to be displayed can be freely changed without increasing the size of the optical system.

[Third Embodiment]

A display apparatus of the third embodiment will be described below. FIG. 13 is a block diagram showing the arrangement of the display apparatus of the third embodiment. The same reference numerals in the third embodiment denote the same parts as in the second embodiment. Referring to FIG. 13, reference numeral 112 denotes a field angle information detection circuit for detecting optimal field angle information added to a video signal.

The operation of the display apparatus of the third embodiment will be described below. In this case, a description of the same operations as in the second embodiment will be omitted. A video signal input from the input terminal 101R is input to the thin-out/interpolation processing circuit 105R and the field angle information detection circuit 112 via the Y/C separation circuit 102R, the decoder 103R, and the signal processing circuit 104R.

In the video signal input from the input terminal 101R, information associated with an appropriate field angle of an image to be displayed is added in advance to a predetermined portion of the video signal, e.g., a blanking period (e.g., the vertical blanking period) of the video signal. When the movement of an image is not so fast and reality is expected to be obtained with a larger field angle, a large field angle is suitable. On the other hand, when the movement of an image is fast and an observer feels fatigue with a large field angle, a small field angle is suitable.

The field angle information detection circuit 112 detects this field angle information from the video signal, and determines a magnification factor used upon enlargement or reduction of an image in the thin-out/interpolation processing circuits 105R and 105L. The determined magnification factor is input to the magnification control circuit 110 as a control signal, and the magnification control circuit 110 generates a magnification control signal on the basis of the input control signal. The thin-out interpolation processing circuit 105R performs enlargement or reduction processing in accordance with the magnification control signal, and its processing result is displayed on the display device 106R. The same operation as described above is performed in a system constituted by components with a suffix L. On the other hand, the arrangement of the thin-out/interpolation processing circuits 105R and 105L is the same as that in the second embodiment.

As described above, according to the third embodiment, field angle information suitable for an image to be displayed is added in advance to a video signal to be displayed, and the image to be displayed is enlarged or reduced on the basis of the field angle information. For this reason, a display apparatus which can automatically display an image at an optimal field angle in correspondence with the image to be displayed can be provided. The information to be added to the video signal need not always be constant depending on the types of images, but different pieces of information may be added in units of scenes of images, thus realizing an optimal field angle in units of scenes.

In the third embodiment, field angle information is added to the video signal. Alternatively, appropriate field angle information for a corresponding video signal may be input from an input terminal different from that for the video signal. The field angle is automatically set based on the detected field angle information, and an image is displayed at the set field angle. Furthermore, an observer may change the set field angle to a desired one by operating the magnification setting unit 111.

[Fourth Embodiment]

Figure 14:
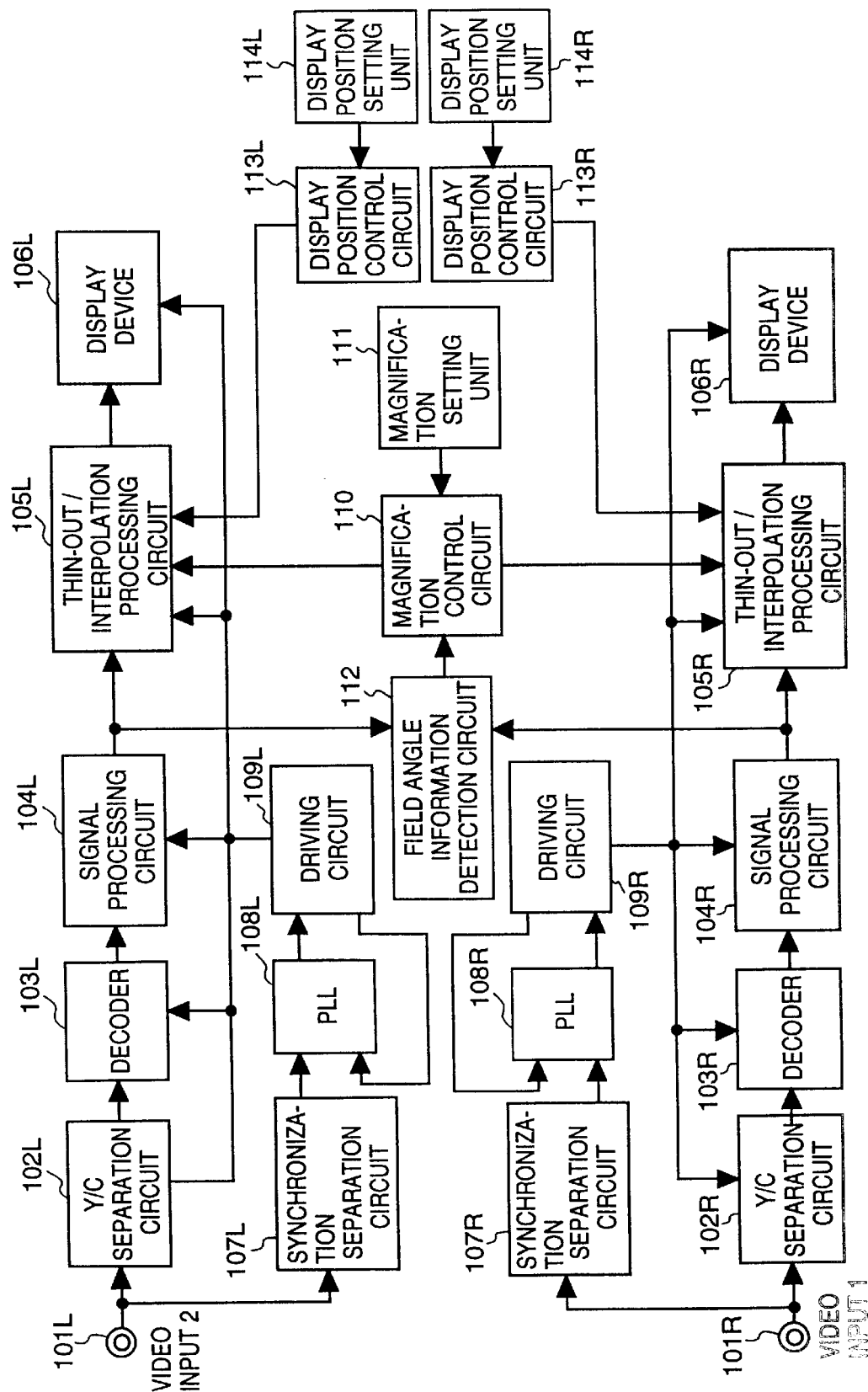
FIG. 14 is a block diagram showing the arrangement of a display apparatus according to the fourth embodiment of the present invention.

A display apparatus of the fourth embodiment will be described below. FIG. 14 is a block diagram showing the arrangement of the display apparatus of the fourth embodiment. The same reference numerals in the fourth embodiment denote the same parts as in the second and third embodiments. Referring to FIG. 14, reference numerals 113R and 113L denote image display position control circuits; and 114R and 114L, display position setting units.

Figure 15:
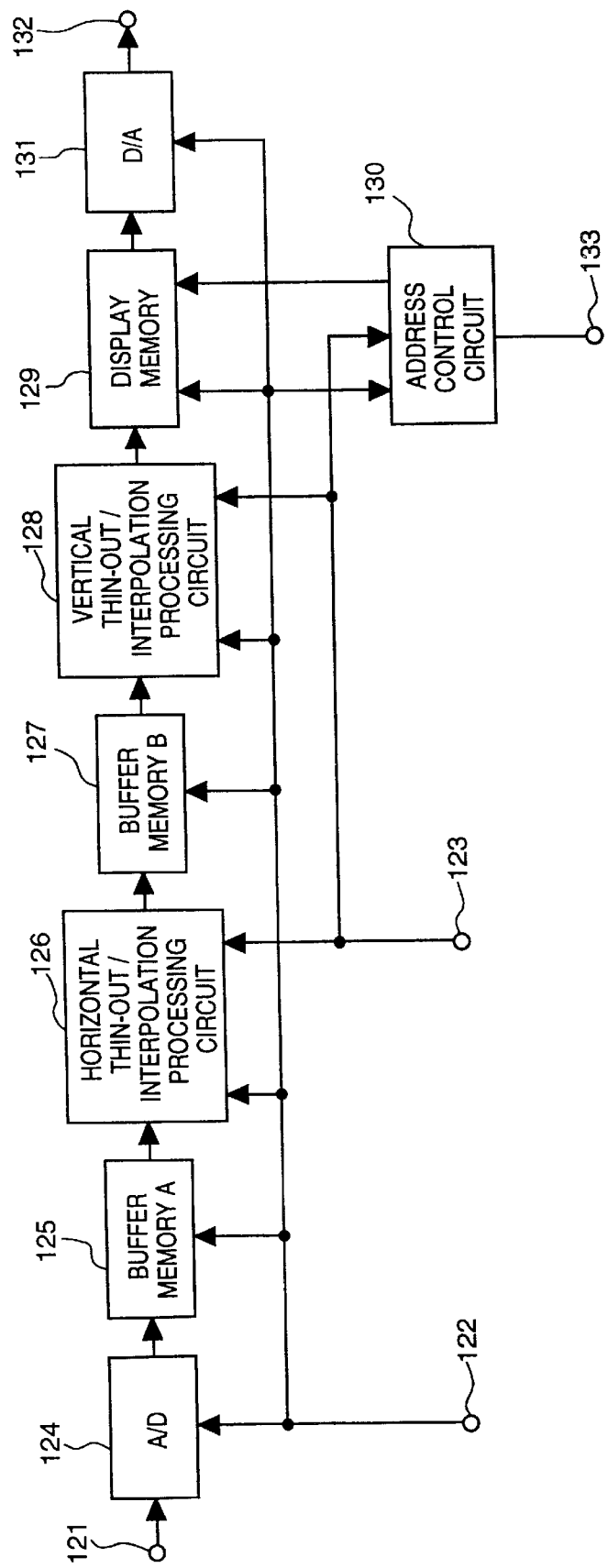
FIG. 15 is a block diagram showing the arrangement of a thin-out/interpolation processing circuit.

FIG. 15 is a block diagram showing the arrangement of a thin-out/interpolation processing circuit of the fourth embodiment. Referring to FIG. 15, reference numeral 133 denotes an input terminal of a display position control signal for controlling the display position of an image. Other constituting elements are the same as those in FIG. 11.

The operation of the display apparatus of the fourth embodiment will be described below. The operations from the input terminals 101R and 101L to the thin-out/interpolation processing circuits 105R and 105L are the same as those in the second and third embodiments. The video signal is input to the thin-out/interpolation processing circuits 105R and 105L via the input terminals 121. The processing operations from the input terminal 121 to the vertical thin-out/interpolation processing circuit 128 are the same as those in the second and third embodiments.

Image data enlarged/reduced by the thin-out/interpolation processing circuit 128 is written in the display memory 129. The address control circuit 130 controls the write address of the display memory 129 on the basis of the display position control signal (which is generated by the display position control circuit 113R or 113L on the basis of the display position set by the display position setting unit 114R or 114L) input from the input terminal 113. For example, when the observer wants to shift the position of the right-eye image to the left, he or she sets the display position setting unit 114R to shift the display position to the left, and the address control circuit 130 writes the output from the thin-out/interpolation processing circuit 128 in the display memory 129 at an address at which the image to be displayed shifts from a normal position to the left.

When the image data written in the display memories 129 in this manner are displayed on the display devices 106R and 106L, the left-eye image is displayed at the normal position and the right-eye image is displayed at a position shifted from the normal position to the left. Similarly, the image to be displayed can be moved in the vertical and horizontal directions, and the left-eye image can also be moved by operating the display position setting unit 114L.

When the observer has difficulty in synthesizing the right and left images upon observation of these images, he or she moves the display position of either the right or left image to a position where he or she can easily synthesize the images, thus easily synthesizing the images. As a result, the observer can easily observe a stereoscopic image.

In the fourth embodiment, the display positions of the right and left images are independently operated by the two operation units. Alternatively, the right and left images may be moved in cooperation with each other using a single operation unit.

[Fifth Embodiment]

Figure 16:
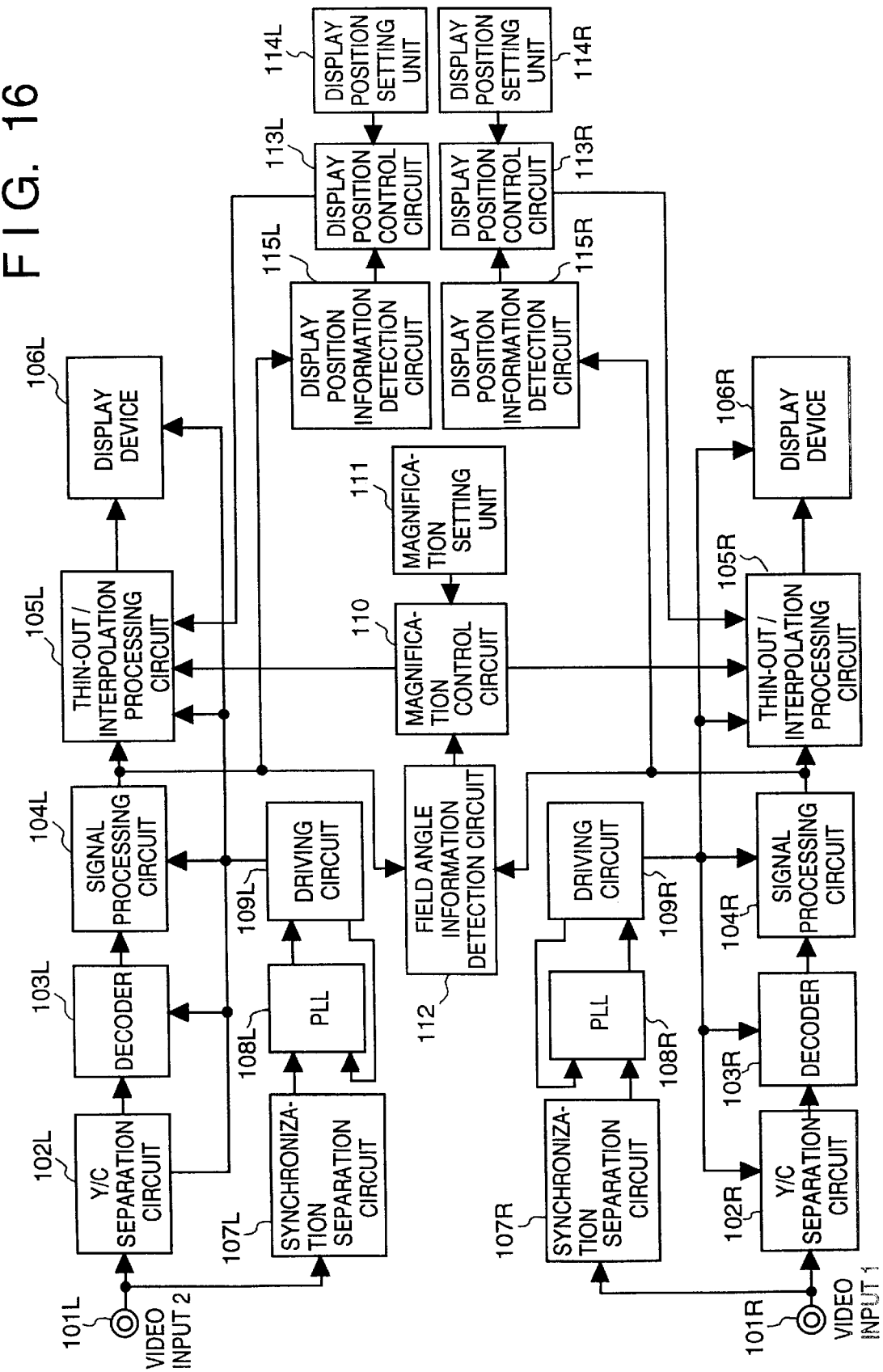
FIG. 16 is a block diagram showing the arrangement of a display apparatus according to the fifth embodiment of the present invention.

A display apparatus of the fifth embodiment will be described below. FIG. 16 is a block diagram showing the arrangement of the display apparatus of the fifth embodiment. The same reference numerals in the fifth embodiment denote the same parts as in the first, second, and third embodiments. Referring to FIG. 16, reference numerals 115R and 115L denote display position information detection circuits each for detecting optimal display position information added to a video signal.

The operation of the display apparatus of the fifth embodiment will be described below. In the display apparatus of the fifth embodiment, information of an appropriate display position added to a video signal is detected, and the display positions of images enlarged/reduced by the thin-out/interpolation processing circuits 105R and 105L on the right and left display devices 106R and 106L are controlled in accordance with the detection display position information.

In a video signal input from the input terminal 101R, information associated with an appropriate field angle of an image to be displayed is added in advance to a predetermined portion of the video signal, e.g., a blanking period (e.g., the vertical blanking period) of the video signal, and is detected by the display position information detection circuits 115R and 115L. Based on the detected display position information, the display position control circuits 113R and 113L controls the thin-out/interpolation processing circuits 105R and 105L. In this manner, the write address of the display memory 129 is controlled as in the fourth embodiment. With this control, the display positions of the display devices 106R and 106L for displaying the right and left images can be controlled.

Since the convergence angle can be changed by moving the display positions of images to be displayed on the right and left display devices 106R and 106L in the horizontal direction, an observer can automatically observe an image under an optimal convergence condition by adding information associated with an optimal convergence angle upon display of a video signal. As another example, the right and left images are displayed on the lower portions of the display devices 106R and 106L when an image is displayed as if it were located near; the images are displayed on the upper portions when an image is displayed as if it were located far. In this manner, a sense of distance can be given to a displayed image by the psychological effect based on the perspective presentation, and the observer can experience more reality.

In this manner, information associated with the display position suitable for displaying an image is added to a video signal to be displayed, and the display position is set based on the information, thus providing a display apparatus which can automatically display an image at a display position suitable for the image.

In this embodiment, the display position information is added to the video signal. Alternatively, information of an appropriate display position for a video signal may be input from an input terminal different from that for the video signal. An image is automatically displayed at the display position set based on the detected display position information. Furthermore, an observer can move the image to a desired position by operating the display position setting units 114L and 114R.

As described above, according to the second embodiment, an image of an input video signal is displayed by the display device 106L at the display position to be observed by the left eye, and is displayed by the display device 106R at the display position to be observed by the right eye. The magnification setting unit 111 sets a magnification factor upon enlargement/reduction of an image, and the thin-out/interpolation processing circuits 105R and 105L enlarge/reduce the image in accordance with the magnification factor. Since the display devices 106R and 106L display the enlarged/reduced images at display positions having a relatively equal positional relationship therebetween, the field angle of the displayed image can be freely changed without increasing the size of an optical system.

According to the third embodiment, the field angle information detection circuit 112 detects field angle information optimal for displaying an image of an input video signal, and the thin-out/interpolation processing circuits 105R and 105L enlarge/reduce an image in accordance with a magnification factor determined based on the detected field angle information. Since the display devices 106R and 106L display the enlarged/reduced images at display positions having a relatively equal positional relationship therebetween, an image can be automatically displayed at an optimal field angle in correspondence with the input image.

According to the fourth embodiment, since the display position setting units 114R and 114L sets the display positions, on the display devices 106R and 106L, of enlarged/reduced images, and the display position control circuits 113R and 113L display the images at the set display positions, an observer can easily synthesize the right and left images.

According to the fifth embodiment, the display position information detection circuits 115R and 115L detect the information of appropriate display positions of images to be displayed from an input video signal. Since enlarged/reduced images are displayed on the basis of the detected display position information, an observer can observe an image under an optimal condition in terms of a field angle, convergence angle, and the like.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the appended claims.

What is claimed is:

1. A display apparatus having a display unit which displays an image that can be observed by an observer while being mounted on a head of the observer, comprising:
    first image input means for inputting a first image information;
    second image input means for inputting a second image information;
    display means which defines a first image display range and a second image display range on the display unit, and displays said first and second image information on said first and second image display range respectively;
    detection means for detecting a displacement of said display apparatus; and
    first control means for displaying said first image display range with said second image display range, changing a relative positional relationship between the first and second image display ranges on the basis of the displacement detected by said detection means in a case that the detected displacement amount is greater than a predetermined amount, and maintaining said relative positional relationship unchanged in a case that the detected displacement amount is smaller than the predetermined amount.

2. The apparatus according to claim 1, further comprising:
    discrimination means for discriminating whether an amount of the displacement detected by said detection means exceeds a predetermined amount; and
    second control means for controlling based on a discrimination result of said discrimination means whether or not control of said first control means is executed.

3. The apparatus according to claim 2, wherein said discrimination means decomposes the amount of the displacement detected by said detection means into displacement amounts in units of direction components, and discriminates if the displacement amounts in units of direction components exceed a predetermined amount.

4. The apparatus according to claim 1, wherein said first control means moves the first image display range within the second image display range on the basis of the displacement detected by said detection means.

5. The apparatus according to claim 4, wherein a moving direction of the first image display range in the second image display range by said first control means is opposite to a direction of the displacement detected by said detection means.

6. The apparatus according to claim 1, wherein said first control means performs enlargement/reduction of the first display range and an image displayed thereon on the basis of the displacement detected by said detection means.

7. The apparatus according to claim 1, wherein said first control means comprises a plurality of display changing means, each of which changes a display state on the first image display range in accordance with corresponding prescribed contents on the basis of the displacement detected by said detection means, and said first control means changes the display state on the first image display range using at least one of said plurality of display changing means.

8. The apparatus according to claim 7, wherein each of said plurality of display changing means moves the first image display range in one or a plurality of directions or enlarges/reduces the first image display range on the basis of the displacement detected by said detection means.

9. The apparatus according to claim 7, further comprising setting means for selecting one of said plurality of display changing means, which is to be used.

10. The apparatus according to claim 7, further comprising:
    detection means for detecting use information indicating one of said plurality of display changing means, which is to be used from a video signal to be displayed by said display means; and
    setting means for setting the display changing means to be used upon display of an image based on the video signal on the basis of the use information.

11. The apparatus according to claim 8, wherein said detection means acquires the use information on the basis of a signal superposed on a blanking period of the video signal.

12. The apparatus according to claim 1, wherein the image displayed in the first image display range is a moving picture.

13. A display apparatus for displaying images corresponding to right and left eyes, respectively, of an observer based on an input video signal on display units for the right and left eyes, comprising:

setting means for setting a magnification factor used for enlarging/reducing the images;

enlargement/reduction means for electrically enlarging/reducing the images in accordance with the magnification factor set by said setting means; and display means for displaying the images enlarged/reduced by said enlargement/reduction means on each of the display units for the right and left eyes to maintain a relative positional relationship between the images and a display range of each of the display units, wherein said setting means detects magnification information indicating the magnification factor from the video signal, and sets the magnification factor on the basis of the magnification information.

14. The apparatus according to claim 13, wherein said detection means acquires the magnification information on the basis of a signal superposed on a blanking period of the video signal.

15. The apparatus according to claim 13, wherein the image based on the video signal is a stereoscopic image.

16. The apparatus according to claim 13, wherein said enlargement/reduction means enlarges/reduces the image by electrically processing the input video signal.

17. The apparatus according to claim 16, wherein said enlargement/reduction means performs interpolation or thin-out processing for the video signal.

18. A display apparatus for displaying images corresponding to right and left eyes, respectively, of an observer based on an input video signal on display units for the right and left eyes, comprising:

first setting means for setting a magnification factor used for enlarging/reducing the images;

enlargement/reduction means for electrically enlarging/reducing the images in accordance with the magnification factor set by said first setting means;

second setting means for desirably setting display positions independently and separately on the display units for the right and left eyes, of the images enlarged/reduced by said enlargement/reduction means; and display means for displaying the images enlarged/reduced by said enlargement/reduction means at the display positions set by said second setting means on the display units for the right and left eyes.

19. The apparatus according to claim 18, wherein said second setting means detects position information indicating the display positions from the video signal, and sets the display positions on the basis of the position information.

20. The apparatus according to claim 19, wherein said detection means acquires the position information on the basis of a signal superposed on a blanking period of the video signal.

21. The apparatus according to claim 18, wherein the image based on the video signal is a stereoscopic image.

22. The apparatus according to claim 18, wherein said enlargement/reduction means enlarges/reduces the image by electrically processing the input video signal.

23. The apparatus according to claim 22, wherein said enlargement/reduction means performs interpolation or thin-out processing for the video signal.

24. A control method of a display apparatus having a display unit which displays an image that can be observed by an observer while being mounted on a head of the observer, comprising:

the inputting step of inputting first image information and second image information;

the display step of defining a first image display range and a second image display range on the display unit, and displaying said first and second image information on said first and second image display range, respectively;

the detection step of detecting a displacement of the display apparatus; and the control step of displaying said first image display range with said second image display range, changing a relative positional relationship between the first and second image display ranges on the basis of the displacement detected in the detection step in a case that the detected displacement amount is greater than a predetermined amount, and maintaining said relative positional relationship unchanged in a case that the detected displacement amount is smaller than the predetermined amount.

25. The method according to claim 24, further comprising:

the discrimination step of discriminating whether an amount of the displacement detected in the detection step exceeds a predetermined amount; and the second control step of controlling based on a discrimination result in the discrimination step whether or not the first control step is executed.

26. The method according to claim 25, wherein the discrimination step includes the step of decomposing the amount of the displacement detected in the detection step into displacement amounts in units of direction components, and discriminating if the displacement amounts in units of direction components exceed a predetermined amount.

27. The method according to claim 24, wherein the first control step includes the step of moving the first image display range within the second image display range on the basis of the displacement detected in the detection step.

28. The method according to claim 27, wherein a moving direction of the first image display range in the second image display range in the first control step is opposite to a direction of the displacement detected in the detection step.

29. The method according to claim 24, wherein the first control step includes the step of performing enlargement/reduction of the first display range and an image displayed thereon on the basis of the displacement detected in the detection step.

30. The method according to claim 24, wherein the first control step comprises a plurality of display changing steps, each of which changes a display state on the first image display range in accordance with corresponding prescribed contents on the basis of the displacement detected in the detection step, and the first control step includes the step of changing the display state on the first image display range using at least one of the plurality of display changing steps.

31. The method according to claim 30, wherein each of the plurality of display changing steps includes the step of moving the first image display range in one or a plurality of directions or enlarging/reducing the first image display range on the basis of the displacement detected in the detection step.

32. The method according to claim 30, further comprising the setting step of selecting one of the plurality of display changing steps, which is to be used.

33. The method according to claim 30, further comprising:

the detection step of detecting use information indicating one of the plurality of display changing steps, which is to be used from a video signal to be displayed in the display step; and the setting step of setting the display changing step to be used upon display of an image based on the video signal on the basis of the use information.

34. The method according to claim 31, wherein the detection step includes the step of acquiring the use information on the basis of a signal superposed on a blanking period of the video signal.

35. The method according to claim 24, wherein the image displayed in the first image display range is a moving picture.

36. A control method of a display apparatus for displaying images corresponding to right and left eyes, respectively, of an observer based on an input video signal on display units for the right and left eyes, comprising:

the setting step of setting a magnification factor used for enlarging/reducing the images;

the enlargement/reduction step of electrically enlarging/reducing the image in accordance with the magnification factor set in the setting step; and the display step of displaying the images enlarged/reduced in the enlargement/reduction step on each of the display units for the right and left eyes to maintain a relative positional relationship between the images and a display range of each of the display units, wherein the setting step includes the step of detecting magnification information indicating the magnification factor from the video signal, and setting the magnification factor on the basis of the magnification information.

37. The method according to claim 35, wherein the detection step includes the step of acquiring the magnification information on the basis of a signal superposed on a blanking period of the video signal.

38. The method according to claim 35, wherein the image based on the video signal is a stereoscopic image.

39. The method according to claim 36, wherein said enlargement/reduction step enlarges/reduces the image by electrically processing the input video signal.

40. The method according to claim 39, wherein said enlargement/reduction step performs interpolation or thin-out processing for the video signal.

41. A control method of a display apparatus for displaying images corresponding to right and left eyes, respectively, of an observer based on an input video signal on display units for right and left eyes, comprising:

the first setting step of setting a magnification factor used for enlarging/reducing the images;

the enlargement/reduction step of electrically enlarging/reducing the images in accordance with the magnification factor set in the first setting step;

the second setting step of desirably setting display positions independently and separately on the display units for the right and left eyes, of the images enlarged/reduced in the enlargement/reduction step; and the display step of displaying the images enlarged/reduced in the enlargement/reduction step at the display positions set in the second setting step on the display units for the right and left eyes.

42. The method according to claim 41, wherein the second setting step includes the step of detecting position information indicating the display positions from the video signal, and setting the display positions on the basis of the position information.

43. The method according to claim 42, wherein the detection step includes the step of acquiring the position information on the basis of a signal superposed on a blanking period of the video signal.

44. The method according to claim 41, wherein the image based on the video signal is a stereoscopic image.

45. The method according to claim 41, wherein said enlargement/reduction step enlarges/reduces the image by electrically processing the input video signal.

46. The apparatus according to claim 45, wherein said enlargement/reduction step performs interpolation or thin-out processing for the video signal.

* * * * *